US006928450B2

(12) United States Patent
Mogi et al.

(10) Patent No.: US 6,928,450 B2
(45) Date of Patent: Aug. 9, 2005

(54) STORAGE APPARATUS ACQUIRING STATIC INFORMATION RELATED TO DATABASE MANAGEMENT SYSTEM

(75) Inventors: Kazuhiko Mogi, Yokohama (JP); Takashi Oeda, Sagamihara (JP); Masaru Kitsuregawa, Matsudo (JP)

(73) Assignee: Hitachi, Ltd., Tokyo (JP)

( * ) Notice: Subject to any disclaimer, the term of this patent is extended or adjusted under 35 U.S.C. 154(b) by 444 days.

(21) Appl. No.: 10/083,354

(22) Filed: Feb. 27, 2002

(65) Prior Publication Data

US 2003/0093442 A1 May 15, 2003

(30) Foreign Application Priority Data

Nov. 12, 2001 (JP) ........................................ 2001-345525

(51) Int. Cl.[7] ............................................. G07F 17/30
(52) U.S. Cl. ........................................................ 707/102
(58) Field of Search ........................................ 707/102

(56) References Cited

U.S. PATENT DOCUMENTS

| | | | |
|---|---|---|---|
| 5,317,727 A | | 5/1994 | Tsuchida et al. |
| 5,687,363 A | * | 11/1997 | Oulid-Aissa et al. .......... 707/4 |
| 5,857,207 A | * | 1/1999 | Lo et al. ...................... 707/203 |
| 6,009,432 A | * | 12/1999 | Tarin ............................ 707/10 |
| 6,035,306 A | | 3/2000 | Lowenthal et al. |
| 6,182,139 B1 | * | 1/2001 | Brendel ....................... 709/226 |
| 6,256,773 B1 | * | 7/2001 | Bowman-Amuah ......... 717/121 |
| 6,573,907 B1 | * | 6/2003 | Madrane ..................... 345/719 |
| 6,611,525 B1 | * | 8/2003 | Natanson et al. ...... 370/395.53 |
| 6,618,719 B1 | * | 9/2003 | Andrei .......................... 707/2 |
| 6,778,651 B1 | * | 8/2004 | Jost et al. .............. 379/201.01 |

FOREIGN PATENT DOCUMENTS

| | | |
|---|---|---|
| JP | 9-274544 | 10/1997 |
| JP | 2001-67187 | 3/2001 |

OTHER PUBLICATIONS

Institute of Electronics, Information and Communication Engineers, The Technical Group on Data Engineering, 11th Data Engineering Workshop, Collected Papers Lecture No. 3B–3, Jul. 2000, Mukai et al, "Evaluation of Prefetch Mechanism Using Access Plan on Intelligent Disk".

Oracle Corp., "Designing and Tuning for Performance Release 2", Chapter 20, (8.1.6).

\* cited by examiner

Primary Examiner—Wayne Amsbury
(74) Attorney, Agent, or Firm—Mattingly, Stanger, Malur & Brundidge, P.C.

(57) ABSTRACT

A storage apparatus acquires static constituent information of a database management system (DBMS) through a network by using a DBMS information acquisition/communication program, DBMS information communication portion, and host information setting program, and stores them as DBMS data information in its memory. The physical storage position managing/optimizing execution portion within a control program of the storage apparatus makes data allocation and cache control that consider the characteristics of the data base management system by using DBMS data information, thereby improving the data access performance of the storage apparatus.

23 Claims, 27 Drawing Sheets

FIG.3

TABLE DEFINITION INFO. — 551

```
Table T1 (                  Table T2 (
  Key1    Numeric(10)         Key1    Numeric(10)
  A       Char(16)            Key2    Numeric(12)
  B       Numeric(10.2)       C       VarChar(12x)
)                           )
primary key Key1            primary key Key2
                            foreign key Key1 ref.T11.Key1
```

INDEX DEFINITION INFO. — 552

| Unique Tree Index Ind1-1 on T1(Key1) | BitMap Index Ind1-2 on Tl(A) | Unique Tree Index 1nd2-1 on T2(Key2) | ... |

LOG INFO. — 553

| Log 1 | Log 2 | Log 3 |

TEMPORARY TABLE REGION INFO. — 554

| Temp 1 | Temp 2 |

MAXIMUM ACCESS PARALLELISM INFO. — 557

| DATA STRUCTURE NAME (561) | T1 | T2 | ... | Ind1-1 | ... | Temp 1 | ... |
|---|---|---|---|---|---|---|---|
| MAXIMUM ACCESS PARALLELISM (569) | 2 | 4 | ... | 4 | ... | 4 | ... |

DATA STORAGE POSITION INFO. — 555

| DATA STRUCTURE NAME (561) | DATA FILE PATH NAME (562) | FILE BLOCK NUMBER (563) |
|---|---|---|
| T1 | /dev/rdsk/lvol 0 | 0-499 |
| T1 | /dev/rdsk/lvol 0 | 2000-2499 |
| T2 | /dev/rdsk/lvol 0 | 500-799 |
| ⋮ | ⋮ | ⋮ |
| Ind1-1 | /dev/rdsk/lvol 1 | 5000-7499 |
| ⋮ | ⋮ | ⋮ |
| Log 1 | /dev/rdsk/lvol 1 | 0-999 |
| ⋮ | ⋮ | ⋮ |
| Temp 1 | /dev/rdsk/lvol 1 | 3000-4999 |
| ⋮ | ⋮ | ⋮ |

CACHE STRUCTURE INFO. — 556

| GROUP NAME (565) | CACHE SIZE (566) | ASSIGNED DATA STRUCTURE NAME (567) |
|---|---|---|
| High | 10000 blocks | T1, Ind1-1, Ind1-2 |
| Middle | 5000 blocks | T2, Ind1-2, Ind2-1, ... |
| Low | 1000 blocks | T3, Ind3-1, ... |

SCHEMA INFO. — 114

FIG.6

| VOLUME NAME | Vol 0 | Vol 0 | Vol 1 | ... | 501 |
|---|---|---|---|---|---|
| PHYSICAL STORAGE DEVICE NAME | Pdisk 0 | Pdisk 1 | Pdisk 0 | ... | 502 |
| CUMULATIVE OPERATION TIME | 23917390 | 38902849 | 8012891 | ... | 503 |
| PREVIOUS CUMULATIVE OPERATION TIME | 22787638 | 38783484 | 7592039 | ... | 593 |
| OPERATION RATE 2000/4/1 12:00~ 2000/4/1 12:15 | 20% | 12% | 4% | ... | |
| 2000/4/1 12:15~ 2000/4/1 12:30 | 15% | 10% | 7% | ... | 594 |
| 2000/4/1 12:30~ 2000/4/1 12:45 | 16% | 9% | 5% | ... | |
| ⋮ | ⋮ | ⋮ | ⋮ | ⋮ | |

595 — PREVIOUS CUMULATIVE OPERATION TIME ACQUIRING TIME

PHYSICAL STORAGE DEVICE OPERATION INFO. — 32

FIG.7

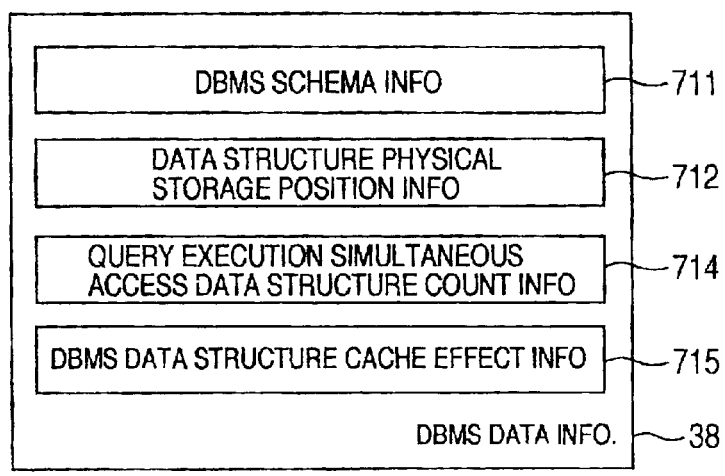

- DBMS SCHEMA INFO — 711
- DATA STRUCTURE PHYSICAL STORAGE POSITION INFO — 712
- QUERY EXECUTION SIMULTANEOUS ACCESS DATA STRUCTURE COUNT INFO — 714
- DBMS DATA STRUCTURE CACHE EFFECT INFO — 715

DBMS DATA INFO. — 38

FIG.8

DBMS DATA STRUCTURE INFO. — 621

| | | | | | | |
|---|---|---|---|---|---|---|
| DBMS NAME | DBMS 1 | ... | DBMS 1 | ... | DBMS 1 | ... | DBMS 1 | ... | DBMS 2 | ... |
| DATA STRUCTURE NAME | TI | ... | Ind1-1 | ... | Log 1 | ... | Temp 1 | ... | TI | ... |
| DATA STRUCTURE TYPE | TABLE | ... | INDEX | ... | LOG | ... | TEMPORAY TABLE | ... | TABLE | ... |
| DATA AMOUNT OF DATA STRUCTURE | 128MB | ... | 8MB | ... | 32MB | ... | 128MB | ... | 512MB | ... |
| MAXIMUM ACCESS PALLELISM | 2 | ... | 4 | ... | - | ... | 4 | ... | 2 | ... |

631 — DBMS NAME
561 — DATA STRUCTURE NAME
640 — DATA STRUCTURE TYPE
641 — DATA AMOUNT OF DATA STRUCTURE
569 — MAXIMUM ACCESS PALLELISM

DBMS DATA STORAGE POSITION INFO. — 622

| DBMS NAME | DATA STORAGE POSITION INFO |
|---|---|
| DBMS 1 | DATA STORAGE POSITION INFO.555 IN DBMS 1 |
| DBMS 2 | DATA STORAGE POSITION INFO.555 IN DBMS 2 |
| : | : |

631    638

DBMS PARTITIONED TABLE/INDEX INFO. — 623

| DBMS NAME | BEFORE PARTITIONED ORIGINAL DATA STRUCTURE NAME | DATA STRUCTURE NAME | PARTITIONING METHOD |
|---|---|---|---|
| DBMS 1 | T4 | T4.P1 | T4.N<-50 |
|  |  | T4.P2 | T4.N>50 |
| : | : | : | : |

631   643   561   644

DBMS INDEX DEFINITION INFO. — 624

| DBMS NAME | DBMS 1 | DBMS 1 | ... | DBMS 2 | ... |
|---|---|---|---|---|---|
| INDEX NAME | Ind1-1 | Ind1-2 | ... | Indi-1 | ... |
| INTEX TYPE | Tree | BitMap | ... | Tree | ... |
| COORDINATE TABLE INFO | TI(Key1) | TI(A) | ... | TI(ID1) | ... |

631 — DBMS NAME
635 — INDEX NAME
636 — INTEX TYPE
637 — COORDINATE TABLE INFO

DBMS HOST INFO. — 626

| DBMS NAME | HOST NAME |
|---|---|
| DBMS 1 | DB_Host1 |
| DBMS 2 | DB_Host2 |
| : | : |

631   651

DBMS CACHE STRUCTURE INFO. — 625

| DBMS NAME | CACHE STRUCTURE INFO. |
|---|---|
| DBMS 1 | CACHE STRUCTURE INFO. 556 IN DBMS 1 |
| DBMS 2 | CACHE STRUCTURE INFO. 556 IN DBMS 2 |
| : | : |

631   639

DBMS SCHEMA INFO. — 711

FIG.9

| DBMS NAME | DBMS 1 | DBMS 1 | DBMS 1 | ... | DBMS 2 | ... | 631 |
|---|---|---|---|---|---|---|---|
| DATA STRUCTURE NAME | T1 | T1 | T2 | ... | Ti | ... | 561 |
| VOLUME NAME | Vol 0 | Vol 1 | Vol 0 | ... | Vol 2 | ... | 501 |
| VOLUME LOGICAL BLOCK NUMBER | 0-4999 | 5000-9999 | 0-239 | ... | 0-9999 | ... | 512 |
| PHYSICAL STORAGE DEVICE NAME | Pdisk 0 | Pdisk 0 | Pdisk 0 | ... | Pdisk 1 | ... | 502 |
| PHYSICAL BLOCK NUMBER | 0-4999 | 10240-15239 | 10000-10239 | ... | 20480-30479 | ... | 514 |

DATA STRUCTURE PHYSICAL STORAGE POSITION INFO. — 712

FIG.10

| DBMS NAME (631) | DATA STRUCTURE NAME A (701) | DATA STRUCTURE NAME B (702) | COUNT (703) |
|---|---|---|---|
| DBMS 1 | T1 | Ind 1-1 | 2789 |
| ⋮ | ⋮ | ⋮ | ⋮ |
| DBMS 2 | Ti | Ind i-1 | 829 |
| ⋮ | ⋮ | ⋮ | ⋮ |

QUERY EXECUTION SIMULTANEOUS ACCESS DATA STRUCTURE COUNT INFO. — 714

FIG.11

| DBMS NAME (631) | DATA STRUCTURE NAME (561) | CACHE EFFECT INFO (733) |
|---|---|---|
| DBMS 1 | T1 | THERE IS |
| DBMS 1 | Ind1-1 | THERE IS |
| DBMS 1 | T2 | THERE IS NO |
| ⋮ | ⋮ | ⋮ |
| DBMS 2 | Ti | THERE IS |
| ⋮ | ⋮ | ⋮ |

DBMS DATA STRUCTURE CACHE EFFECT INFO — 715

FIG.27
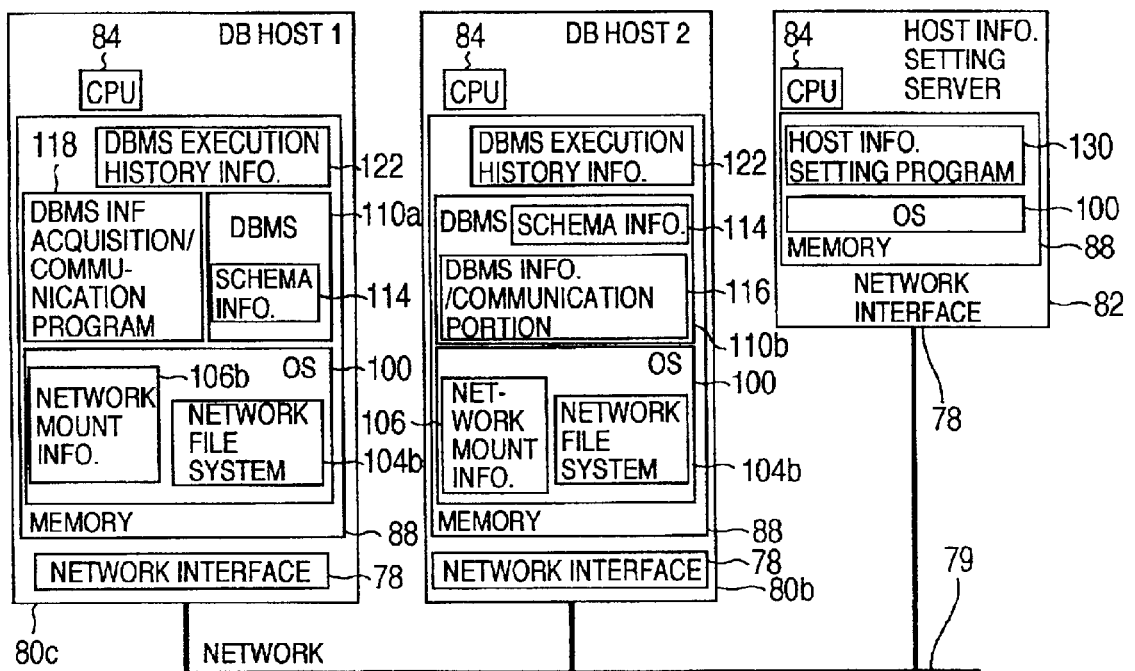
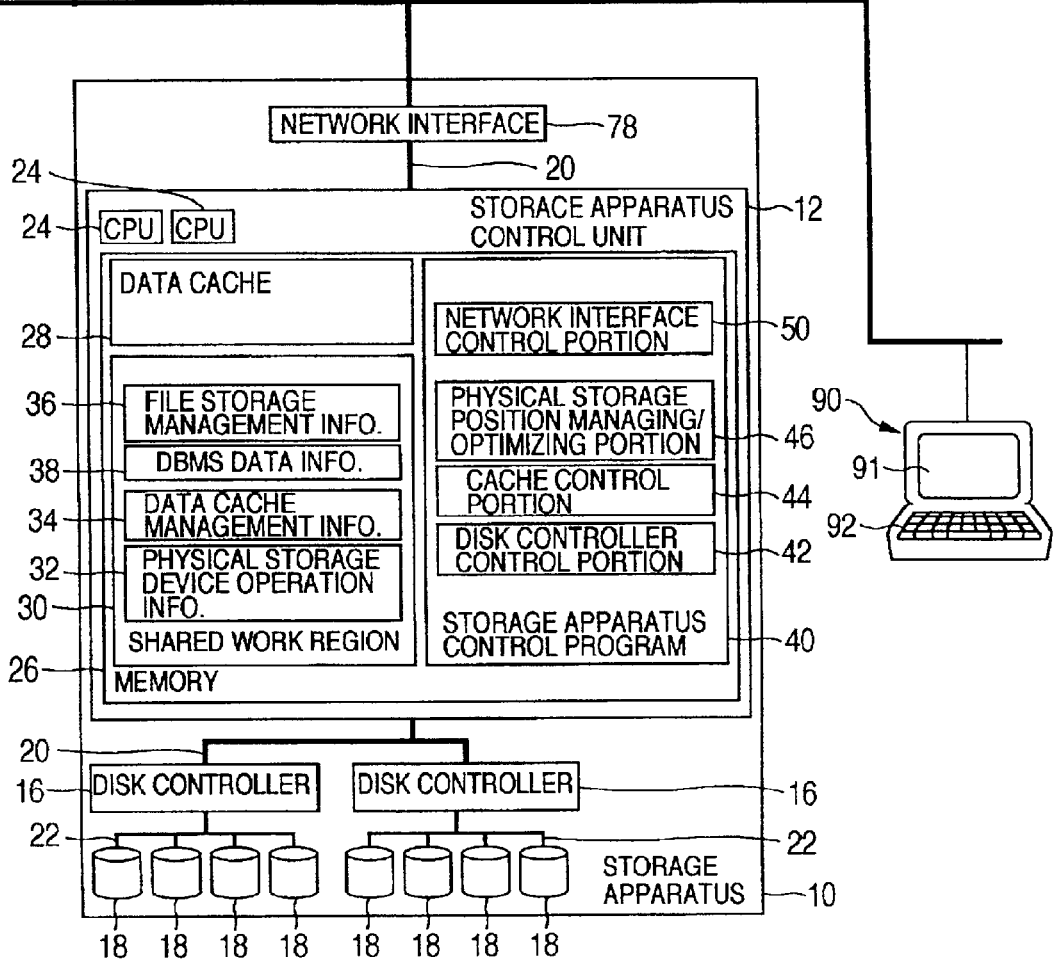

FIG.30

| FILE SYSTEM NAME | FS 0 | FS 0 | FS 1 | ... | 1001 |
|---|---|---|---|---|---|
| PHYSICAL STORAGE DEVICE NAME | Pdisk 0 | Pdisk 1 | Pdisk 0 | ... | 502 |
| CUMULATIVE OPERATION TIME | 23917390 | 38902849 | 8012891 | ... | 503 |
| PREVIOUS CUMULATIVE OPERATION TIME | 22787638 | 38783484 | 7592039 | ... | 593 |
| OPERATION RATE 2000/4/1 12:00~ 2000/4/1 12:15 | 20% | 12% | 4% | ... | |
| 2000/4/1 12:15~ 2000/4/1 12:30 | 15% | 10% | 7% | ... | 594 |
| 2000/4/1 12:30~ 2000/4/1 12:45 | 16% | 9% | 5% | ... | |
| ⋮ | ⋮ | ⋮ | ⋮ | ⋮ | |

595 — PREVIOUS CUMULATIVE OPERATION TIME ACQUIRING TIME

PHYSICAL STORAGE DEVICE OPERATION INFO. — 32b

FIG.31

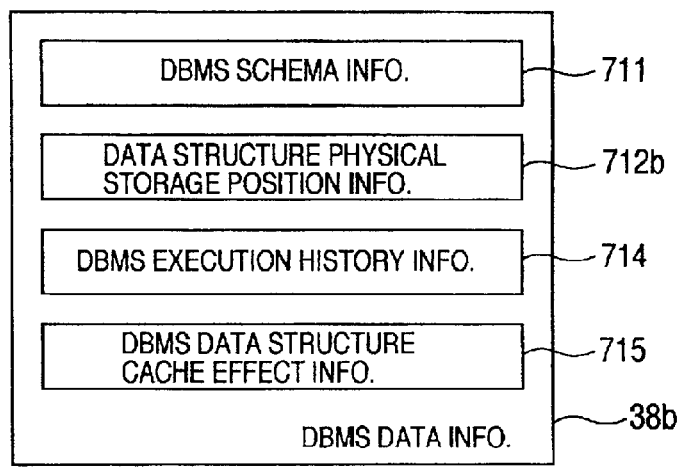

- DBMS SCHEMA INFO. — 711
- DATA STRUCTURE PHYSICAL STORAGE POSITION INFO. — 712b
- DBMS EXECUTION HISTORY INFO. — 714
- DBMS DATA STRUCTURE CACHE EFFECT INFO. — 715

DBMS DATA INFO. — 38b

FIG.32

| DBMS NAME | DBMS 1 | DBMS 1 | DBMS 1 | ... | DBMS 2 | ... | 631 |
|---|---|---|---|---|---|---|---|
| DATA STRUCTURE NAME | T1 | T1 | T2 | ... | Ti | ... | 561 |
| FILE SYSTEM NAME | FS 1 | FS 1 | FS 1 | ... | FS 2 | ... | 1001 |
| FILE PATH NAME | /data 1.dat | /data 1.dat | /data 2.dat | ... | /data i.dat | ... | 1002 |
| FILE BLOCK NUMBER | 0-4999 | 5000-9999 | 0-4999 | ... | 0-9999 | ... | 1003 |
| PHYSICAL STORAGE DEVICE NAME | Pdisk 1 | Pdisk 0 | Pdisk 1 | ... | Pdisk 2 | ... | 514 |
| PHYSICAL BLOCK NUMBER | 10240-15239 | 10240-15239 | 15240-20239 | ... | 20480-30479 | ... | 502 |

DATA STRUCTURE PHYSICAL STORAGE POSITION INFO. ~712b

FIG.33

| SEGMENT ID (721) | FILE SYSTEM NAME (1001) | FILE PATH NAME (1002) | FILE BLOCK NUMBER (1003) | STATUS INFO. (722) | LIST INFO. (723) | | |
|---|---|---|---|---|---|---|---|
| | | | | | LIST NAME | Up | Down |
| 0 | FS 1 | /data 1.dat | 160-175 | DIRTY | FIRST | 342 | 3922 |
| 1 | FS 2 | /data i.dat | 8992-9007 | NORMAL | SECOND | 409 | 1523 |
| 2 | FS 1 | /data 1.dat | 512-527 | NORMAL | FIRST | 4027 | 1627 |
| 3 | FS 0 | /control.dat | 0-15 | WRITE | REUSE | - | 828 |
| ⋮ | ⋮ | ⋮ | ⋮ | ⋮ | ⋮ | | |

CACHE SEGMENT INFO. ~720b

741 —
| MRU SEGMENT ID | LRU SEGMENT ID | NUMBER OF SEGMENT |
|---|---|---|
| 214 | 672 | 11776 |

FIRST LRU LIST INFO

742 —
| MRU SEGMENT ID | LRU SEGMENT ID | NUMBER OF SEGMENT |
|---|---|---|
| 2890 | 2332 | 4096 |

SECOND LRU LIST INFO.

743 —
| MRU SEGMENT ID | LRU SEGMENT ID | NUMBER OF SEGMENT |
|---|---|---|
| 3 | 1442 | 512 |

REUSED LRU LIST INFO

CACHE SEGMENT USE MANAGEMENT INFO. ~740
~34b
DATA CACHE MANAGEMENT INFO.

STORAGE APPARATUS ACQUIRING STATIC INFORMATION RELATED TO DATABASE MANAGEMENT SYSTEM

CROSS-REFERENCE TO RELATED APPLICATION

This application is related to U.S. application Ser. No. 10/084,540, filed Feb. 28, 2002, corresponding to Japanese Patent Application No. 2001-345523 filed Nov. 12, 2001, the contents of which are incorporated herein by reference in its entirety.

BACKGROUND OF THE INVENTION

The present invention generally relates to storage apparatus, and particularly to a storage apparatus having means for acquiring static information of a database management system.

Now many applications are constructed based on database (DB), and thus the database management system (DBMS), which is the software that manages the creation and maintenance of DB and offers functions to access data in DB easily, is extremely important. Particularly, the processing performance of DBMS determines mines the performances of applications that utilize DB, and hence it is vitally important to improve the processing performance of DBMS.

One of the features of DB is a large amount of data to be treated. Therefore, in most environments in which DBMS is executed, a large-capacity storage apparatus is connected to a computer in which DBMS is executed, and data of DB are stored on the storage apparatus. Thus, when processings using data in DB are executed, the access to the storage apparatus occurs, and hence the performance of accessing to data in the storage apparatus affects the performance of DBMS significantly. Accordingly, in a system in which DBMS is operated, it is essential to optimize the performance of the storage apparatus.

The I/O tuning in Oracle 8i of relational DBMS (RDBMS) is described in Chapter 20 (Document 1) of literature "Designing and Tuning for Performance Release 2 (8.1.6)", A76992-01, Oracle Corp. This document discloses matters relevant to data allocation tuning together with the internal operation tuning in RDBMS: log files are stored in physical storage devices separated from the other data files; load balancing by storing data among disks with striping can work effectively; advantageous effects can be obtained by storing table data and index data associated therewith in different physical storage devices; and data having no relation with RDBMS are stored in different physical storage devices.

U.S. Pat. No. 6,035,306 (Document 2) discloses techniques concerned with a performance analysis tool considering the mapping between DBMS-file system-volume manager-storage apparatus. This performance analysis tool allows the workloads of objects in each layer to be displayed on screen. At this time, considering the above mapping, a function is given to facilitate the displaying of the workloads of objects of other layers associated with the above respective objects. In addition, as to the objects of volume manager layer, a function is provided to form an object relocation plan by which the second-highest-loaded objects stored in a highly-loaded storage device group is migrated to the lowest-loaded storage device group.

JP-A-9-274544 (Document 3) discloses a storage apparatus having a function to arrange logical storage devices used when a computer makes accesses on physical storage devices for actually storing data. This storage apparatus can change the mapping of the logical storage devices and physical storage devices dynamically, thereby improving the performance of the storage apparatus to be accessed. Part of the data stored in highly loaded physical storage devices is migrated to other physical storage devices by using the above function to dynamically change the allocation so that particular physical storage devices can be prevented from being highly loaded. Thus, the storage apparatus can be improved in its performance as a whole. A method is also described by which the performance improvement by the dynamic allocation change can be automatically performed.

JP-A-2001-67187 (Document 4) describes a storage apparatus having a function to arrange logical storage devices used when a computer makes accesses on physical storage devices for actually storing data and to dynamically change the allocation of the logical storage devices on the physical storage devices, wherein the physical storage devices are divided into groups having different attributes, and considering the groups, a plan is created for changing the allocation of the logical storage devices on the physical storage devices, and executed so that the allocation of logical storage devices can be automatically changed. That is, before the creation of the allocation changing plan, the physical storage devices are grouped for each attribute, and the allocation changing plan is so generated that the logical storage devices are arranged on physical storage devices of the group having the attribute matched to logical storage device's features.

U.S. Pat. No. 5,317,727 (Document 5) discloses the technique for increasing the operation speed of DBMS by executing part or all of the DBMS processing on the storage controllers side. Since the DBMS processing is performed on the storage controllers, the storage controllers can grasp the data access characteristics, and by considering the data access characteristics and the configuration of the storage apparatus it can reduce the number of times that the physical storage media are accessed uselessly, and read ahead necessary data, so that the DBMS performance can be improved.

An article of "Evaluation of Prefetching Mechanism Using Access Plan on Intelligent Disk" (written by Mukai, et al., The Eleventh Data Engineering Workshop (DEWS 2000) Collected Papers Lecture No. 3B-3, CD-ROM issued July, 2000, and hosted by The Institute of Electronics, Information and Communication Engineers, The Technical Group on Data Engineering) (Document 6) describes the improvement of DBMS performance by intelligent storage apparatus. Specifically, this article discusses the effect of using a data access plan offered on the storage apparatus as knowledge of application level when the query processing is performed on relational database management system (RDBMS). Moreover, for the confirmation of the effect, simulation of the above technique is performed by the read-ahead instruction issued from a host that uses trace data.

What is described in Document 1 should be considered when the administrator determines data allocation. Nowadays, one storage apparatus has a large number of physical storage devices shared by multiple computers. In this storage apparatus, it is often practiced that the logical storage devices the host recognizes are assigned to proper regions of the physical storage devices for actually storing data. When this storage apparatus is used, it is difficult for humankind, e.g., an administrator to grasp all things. If there is not any support function on the computer system side including this storage apparatus, it is difficult to even resolve the problems given in Document 1. Even if the problems could be figured out, under the condition that the computer system has no data-migrating function the backup and restore of data would be necessary in order for data to be relocated on storage devices, thus taking a great deal of labor for that processing.

In the technique described in Document 2, a function is provided to generate an allocation optimizing plan depending on the operating conditions of objects in volume manager layer, but it is necessary to determine the allocation considering the feature of data in DBMS layer when the performance of access to the storage apparatus is desired to further improve. The solution to this aspect is not mentioned in Document 2.

The techniques mentioned in Documents 3 and 4 are associated with the optimization of storage positions of data in the storage devices. Since these techniques allow for only the workloads and sequential accessibility as the features of data used by applications that utilize the storage apparatus, an optimum allocation cannot be always achieved from the application-side point of view. For example, data to be simultaneously accessed, such as table data and index data associated therewith in DBMS, are likely to be placed on the same physical storage device. At this time, access competition occurs in this physical storage device, thus probably lowering the performance of access to the storage apparatus.

Moreover, the techniques mentioned in Documents 1 through 4 particularly do not allow for the use of cache memory in the storage apparatus.

The techniques mentioned in Documents 5 and 6 particularly do not allow for the optimization of storage positions of data. Therefore, since loads on particular physical storage devices are increased, the performance of the storage apparatus lowers, and thus these techniques are not useful for improving the situations in which the performance of DBMS is degraded.

SUMMARY OF THE INVENTION

Accordingly, it is a first object of the invention to achieve a storage apparatus having performance characteristics satisfactory for DBMS by considering the features of DBMS processing in the storage apparatus that holds the data managed by DBMS. By using this storage apparatus, it is possible to improve the performance of DBMS even in the DB system utilizing the existing DBMS.

It is a second object to reduce the cost of managing the performance of the storage apparatus by providing a function to optimize the performance of the storage apparatus. Thus, the system management cost of DB system using this storage apparatus can be reduced.

Information related to DBMS is acquired by the storage apparatus, and the storage apparatus performance optimizing processing is carried out on the storage apparatus by considering the acquired information, the characteristics of physical storage devices of the storage apparatus, and if available, information about the access frequency of other applications using the storage apparatus.

As the first means to be taken for the storage apparatus to achieve a good performance for DBMS by considering the characteristics of DBMS, optimization can be considered for the data positions of logical storage devices when the storage apparatus assigns the logical storage devices that a host recognizes to proper regions of physical storage devices, and makes data to be stored in the regions. For example, update logs where writing is surely performed when data is updated are placed in physical storage devices different from those of other data so that the mutual interference can be prevented, thereby making it possible to achieve good performance characteristics for DBMS.

In addition, table data, and index data associated therewith that are highly likely to be accessed at a time are respectively arranged in different physical storage devices, thereby enabling the storage apparatus to achieve satisfactory performance characteristics for DBMS. Also, the order in which data are sequentially accessed is predicted by using information about DBMS, and the data structures are stored in physical storage devices to hold, thereby making it possible to improve the sequential access performance. Since there is now a technique for dynamically changing the storage positions of logical storage devices, the allocation of data can be optimized by using this technique.

As the second means to be taken for the storage apparatus to achieve a good performance for DBMS by considering the characteristics of DBMS, control using a cache memory can be considered that allows for the DBMS operation on the cache of a host. Because DBMS allows frequently used data to be cached on a cache memory of a host, an advantageous effect could not be much expected to hold the data in the cache of the storage apparatus when the data can be all stored on the host memory.

Moreover, most of DBMS employ LRU (least recently used) algorithm for selecting data to be discarded from the cache of a host. When the cache memory on the storage apparatus can hold only an amount of data that is a certain amount less than the amount of data that can be held on the host cache, the data held on the cache of the storage apparatus are unlikely to be reused by read access while being held in the cache. Thus, even if such data were held on the cache of the storage apparatus, an advantage effect could not be much expected. If such data are controlled on the storage apparatus so that they can be preferentially discarded from the cache, the cache memory of the storage apparatus can hold a larger amount of data that can be highly effectively cached, thus improving the performance of access to the storage apparatus.

According to the invention, first the storage apparatus holding the data managed by DBMS allows for the features of the DBMS processing, thereby making it possible to have better performance characteristics for DBMS. By using this storage apparatus, it is possible to improve the performance of DBMS operation systems without modifying the programs of the existing DBMS. In other words, a high-performance DB system can be easily constructed.

Secondly, since a performance optimizing function is provided in the storage apparatus, the management cost associated with the performance of the storage apparatus can be reduced. Particularly, this invention contributes to improve the performance of DB system, thus making it possible to reduce the management cost concerned with the performance of DB system using this storage apparatus. Moreover, the storage apparatus according to the invention can automatically improve the data allocation allowing for the characteristics of DBMS, thus much contributing to the reduction of the management cost.

Other objects, features and advantages of the invention will become apparent from the following description of the embodiments of the invention taken in conjunction with the accompanying drawings.

BRIEF DESCRIPTION OF THE DRAWINGS

FIG. 3 is a diagram showing schema information 114 of data for definition/management and other management information stored within DBMS 110a, 110b.

FIG. 6 is a diagram showing physical storage device operation information 32 held within the storage apparatus 10.

FIG. 7 is a diagram showing DBMS data information 38 held within the storage apparatus 10.

FIG. 8 is a diagram showing DBMS schema information 711 included within DBMS data information 38.

FIG. 9 is a diagram showing data structure physical storage position information 712 included within DBMS data information 38.

FIG. 10 is a diagram showing query execution simultaneous access data structure count information 714 included within DBMS data information 38.

FIG. 11 is a diagram showing DBMS data structure cache effect information 715 included within DBMS data information 38.

FIG. 27 is a block diagram of a computer system in the second embodiment of the invention.

FIG. 30 is a diagram showing physical storage device operation information 32b held within storage apparatus 10b.

FIG. 31 is a diagram showing DBMS data information 38b held within storage apparatus 10b.

FIG. 32 is a diagram showing data structure physical storage position information 712b included within DBMS data information 38b.

FIG. 33 is a diagram showing data cache management information 34b held within storage apparatus 10b.

DESCRIPTION OF THE EMBODIMENTS

Embodiments of the invention will be described below. The present invention is not limited to the embodiments.

The first embodiment of the invention is a computer system having computers in which PBMS is executed connected to a storage apparatus, wherein the storage apparatus acquires information of DBMS and information of storage position mapping of data outside the storage apparatus and improves its operation by using those information. The storage apparatus has a function to dynamically change data storage positions within the storage apparatus. That is, the storage apparatus generates an appropriate data relocation plan on the basis of the acquired information, and attains a data allocation according to the data relocation plan generated by the function to dynamically change data storage positions, thereby improving the access performance. In addition, better access performance characteristics can be obtained by data cache control based on the acquired information.

Figure 1:
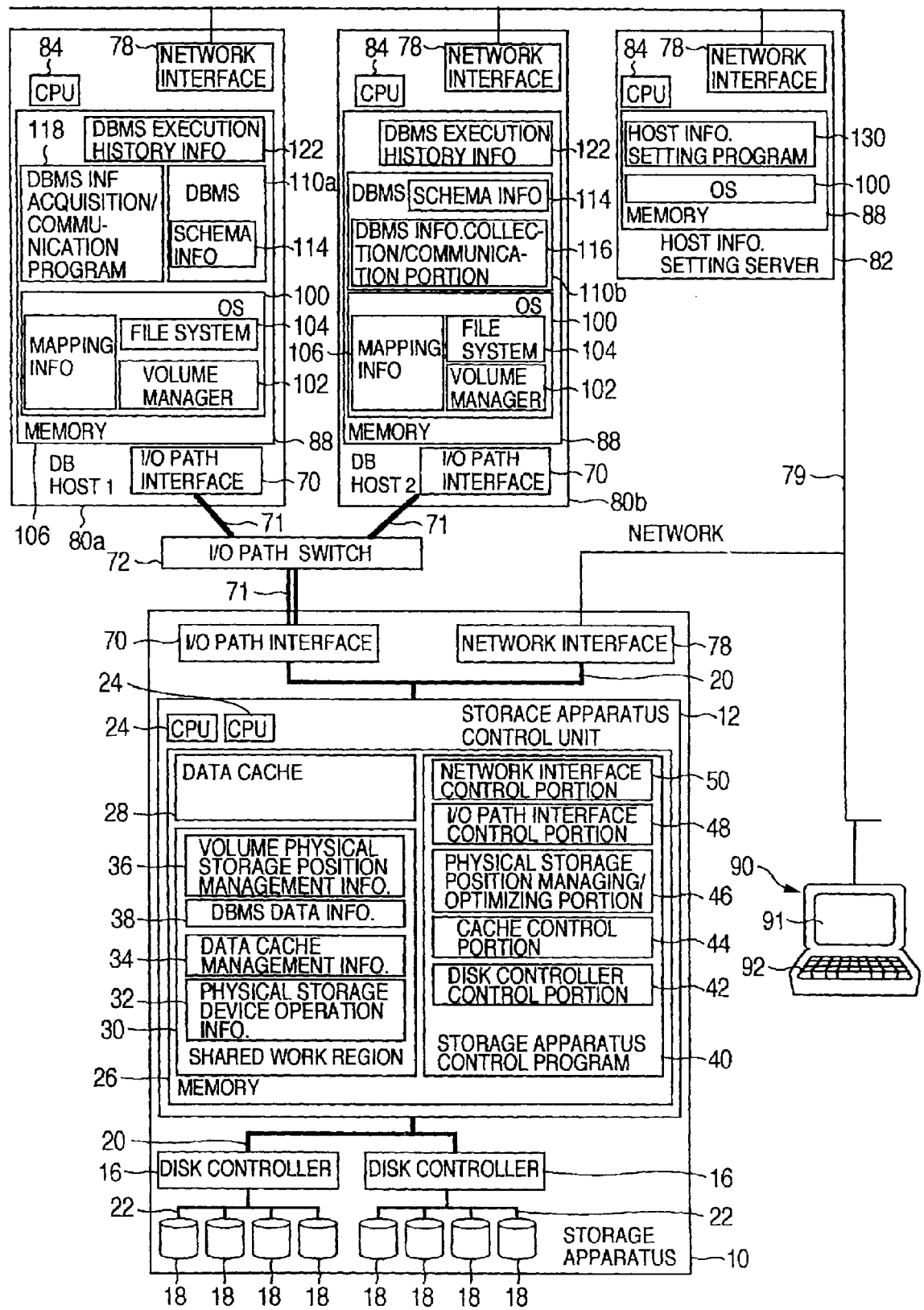
FIG. 1 is a block diagram of the construction of a computer system in the first embodiment of the invention.

FIG. 1 is a construction diagram of a computer system of the first embodiment of the invention. The computer system of this embodiment includes DB hosts 80a, 80b, a host information setting server 82, a storage apparatus 10 and administrator's terminals 90. The DB hosts 80a, 80b, host information setting server 82, storage apparatus 10 and administrator's terminals 90 are each connected to a network 79 through their own network interface, 78. The administrator's terminal 90 has a display screen 91 as an output unit, and a keyboard 92 as an input unit. The DB hosts 80a, 80b and storage apparatus 10 are connected to an I/O path switch 72 via their own I/O path interface 70 and I/O path, 71 so that data can be transferred between the storage apparatus and the DB host 80a, 80b.

While this embodiment uses separate I/O path 71 and network 79 to make data transfer between the storage apparatus 10 and the DB host 80a, 80b, it may utilize a technique, such as iSCSI for implementing the data transfer between the storage apparatus and computers through the network. At this time, the I/O path interface 70 can be omitted from the storage apparatus 10 and DB host 80a, 80b, and the I/O path 71 and I/O path switch 72 can be removed from the computer system.

The storage apparatus 10 provides storage regions, or gives them to the outside as volumes for storage region management units. The partial regions within each volume are accessed to and managed in the form of blocks as units. The storage apparatus 10 includes the network interface 78, the I/O path interface 70, a storage apparatus control unit 12, disk controllers 16, and physical storage devices 18. The network interface 78, I/O path interface 70, storage apparatus control unit 12 and disk controllers 16 are connected by an internal bus 20. The disk controllers 16 and physical storage devices 18 are connected by a physical storage device bus 22. The storage apparatus control unit 12 has CPUs 24 and a memory 26.

The memory 26 has a data cache 28 allotted as a cache memory of the storage apparatus, and a storage apparatus control program 40 stored as a program for controlling the storage apparatus. In addition, the memory 26 has physical storage device operation information 32 as operation information of physical storage devices 18, data cache management information 34 as management information of data cache 28, DBMS data information 38 as information associated with DBMS 110a, 10b executed by DB host 80a, 80b, and volume physical storage position management information 36 as management information of storage positions on the physical storage devices 18 that physically store the volumes provided by the storage apparatus 10.

The storage apparatus 10 has a plurality of physical storage devices 18 as illustrated so that data of one volume can be distributively stored in the physical storage devices 18. The storage apparatus 10 has a function to dynamically change the positions of data stored on the physical storage devices 18. The storage apparatus control program 40 includes a disk controller control portion 42 for controlling the disk controllers 16, a cache control portion 44 for managing the data cache 28, a physical storage position managing/optimizing portion 46 for making a processing associated with the function to manage the volume storage positions on the physical storage devices that physically store the volumes provided by the storage apparatus 10 and to dynamically change the data storage positions on the physical storage devices 18 that store data, an I/O path interface control portion 48 for controlling the I/O path interface 70, and a network interface control portion 50 for controlling the network interface 78.

The DB hosts 80a, 80b and host information setting server 82 each have a CPU 84, a network interface 78, and a memory 88. The memory 88 has an operating system (OS) 100 stored/executed.

The DB host 80a, 80b has the I/O path interface 70 that makes access to the volumes provided by the storage apparatus 10. The OS 100 includes a file system 104, a volume manager 102 for generating logical volumes that the hosts utilize from one or more volumes, and mapping information 106 for managing the recorded positions of data stored in the files and logical raw volumes provided to the applications by the file system 104 and volume manager 102, or by the OS 100. The OS 100 may have a raw device mechanism used for the applications to make access to the volumes that the OS 100 recognizes and to the logical volumes that the volume manager 102 provides through an interface equivalent to files.

While there are the volume managers 102 as illustrated, this embodiment may take a construction in which the file system utilizes the volumes provided by the storage apparatus 10 without using the volume managers 102 since this embodiment does not change the structures of the logical volumes provided by the volume managers 102.

The DBMS 110a, 110b is stored/executed on the memory 88 of the DB host 80a, 80b, and execution history information 122 is stored on the memory 88. The DBMS 110a, 110b has schema information 114. While one host has only a single DBMS 110a or 110b operated as illustrated, this embodiment may take a construction in which a plurality of DBMS are operated in one host since they are managed by use of identifiers for the respective DBMS 110a, 110b as described later.

The DB host 80a has a DBMS information acquisition/communication program 118 operated. The DB host 80b has a DBMS information collection/communication portion 116 that is incorporated in the DBMS 110b instead of the function of the DBMS information acquisition/communication program 118.

A host information setting program 130 is stored/executed on the memory 88 of the host information setting server 82.

Figure 2:
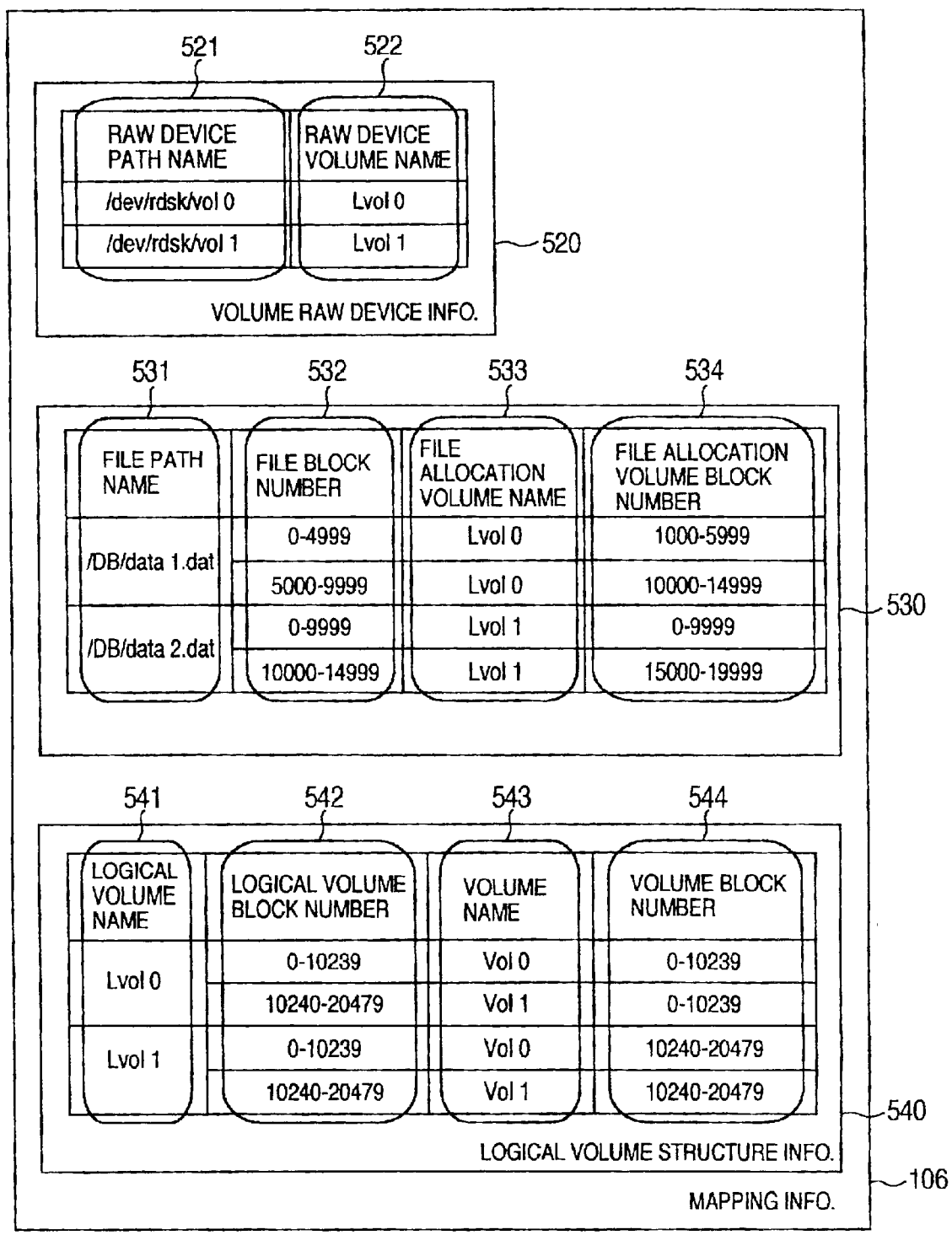
FIG. 2 is a diagram showing mapping information 106 stored within OS 100 of DB host 80a, 80b.

FIG. 2 shows the mapping information 106 stored within the OS 100 of the DB host 80a, 80b. The mapping information 106 includes volume raw device information 520, file storage position information 530 and logical volume structure information 540.

The volume raw device information 520 includes a pair of a raw device path name 521 as an identifier for specifying a raw device in OS 100, and a raw device volume name 522 as an identifier for the volume or logical volume that is provided by the storage apparatus 10 and that is accessed by the raw device.

The file storage position information 530 includes a set of a file path name 531 as an identifier for specifying a file in OS 100, a file block number 532 as a block number for specifying the position of data within the file, a file allocation volume name 533 as an identifier for the volume that is provided by the storage apparatus 10 or logical volume and in which the corresponding data is stored, and a file allocation volume block number 534 as a data storage position on the volume.

The logical volume structure information 540 includes a set of a logical volume name 541 as an identifier for the logical volume provided by the volume manager 102, a logical volume logic block number 542 for indicating the data position on the logical volume, a volume name 501 as an identifier for the volume having the logical block stored, and a volume logical block number 512 as the storage position on the volume. In order to acquire the mapping information 106, it is necessary to execute the management command provided by the OS 100, use the information providing mechanism or sometimes directly analyze the management data to which reference can be made.

FIG. 3 shows the schema information 114 as data and the other management information that are stored within the DBMS 110a, 110b and defined/managed within them. The schema information 114 includes table definition information 551 that holds definition information such as data structure and constraint of table, index definition information 552 that holds definition information such as data structure of index and table associated therewith, log information 553 relevant to logs to be utilized, a temporary table region information 554 related to regions where temporary table are allocated, data storage position information 555 as management information of storage positions of managed data, cache structure information 556 associated with cache structure, and maximum access parallelism information 557 concerned with the degree of parallelism at the time of access to data.

The data storage position information 555 includes a set of a data structure name 561 as an identifier for data structure such as table, index, log and temporary table region, a data file path name 562 as an identifier for file or raw device for storing the data, and a file block number 563 as storage position within it. The cache structure information 556 shows that the DBMS 110a, 110b defines three different cache management groups and assigns cache to the groups.

The cache structure information 556 includes a set of a group name 565, a cache size 566 indicating the largest data size when data of data structure in a group is cached on host, and a data structure name 567 as an identifier for a data structure belonging to the group. The maximum access parallelism information 557 includes a pair of a data structure name 561 and a maximum access parallelism 569 related to the maximum degree of parallelism in the general case in which the data structure is accessed to.

The schema information 114 can be acquired from the outside by using a query language such as SQL to what is offered as management view, or by utilizing a mechanism used only for disclosing internal management data.

Figure 4:
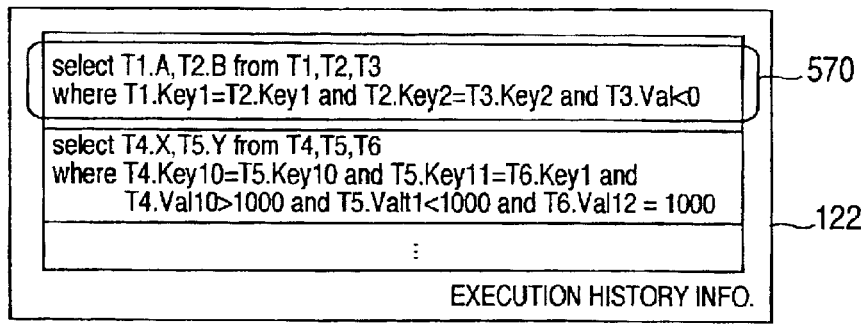
FIG. 4 is a diagram showing execution history information 122 stored on memory 88 of DB host 80a, 80b.

FIG. 4 shows the execution history information 122 stored on the memory 88 of DB host 80a, 80b. The execution history information 122 includes the history of a query 570 executed in DBMS 110a, 110b. This information is generated by DBMS 110a, 110b. Or the front end program of DBMS generates this information. In this case, the execution history information 122 is stored in the computer that has the DBMS front end program.

Figure 5:
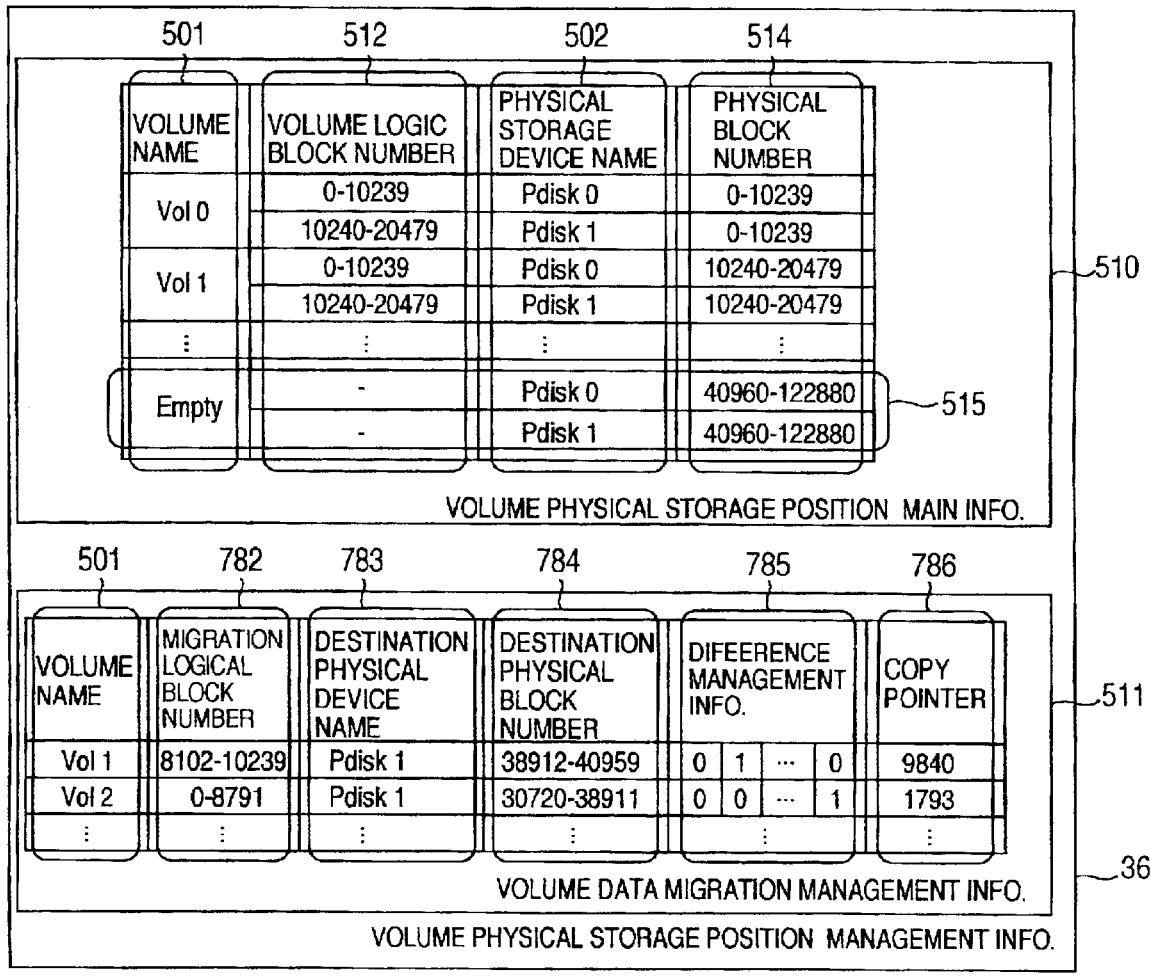
FIG. 5 is a diagram showing volume physical storage position management information 36 held within storage apparatus 10.

FIG. 5 shows the volume physical storage position management information 36 held within the storage apparatus 10. The volume physical storage position management information 36 includes a volume physical storage position main information 510 for managing the mapping of data storage positions in the logical address-physical storage device 18, and a volume data migration managing information 511 as the management information for the change of physical storage positions of data belonging to a volume within the storage apparatus 10.

The volume physical storage position main information 510 includes a set of a volume name 501, a volume logical block number 512 for the data storage position on the volume, a physical storage device name 502 as an identifier for the physical storage device 18 in which the logical block is stored, and a physical block number 514 for the storage position on the physical storage device 18. Here, an entry 515 in which the volume name 501 is "Empty" is a special entry. This entry indicates a region that is not assigned to any volumes, of the regions of the physical storage devices 18 of storage apparatus 10. By copying data to this region, the data can be dynamically changed in its physical storage position.

The volume data migration managing information 511 includes a set of a volume name 501, a migration logical block number 782 for indicating a data range over which the storage position is changed within the volume, a destination physical storage device name 783 for indicating an identifier for the physical storage device 18 in which the data is newly stored, a destination physical block number 784 for indicating its storage region, a copy pointer 786 for indicating the current source from which data is copied, and a difference management information 785 for managing the necessity of recopying data.

The data storage position change processing will be described briefly which utilizes the difference management information 785 and copy pointer 786. The difference management information 785 holds data of "1" indicating necessity of data copying or "0" indicating no necessity for each constant amount of region. When the data storage position change processing begins, all the entries of the difference management information 785 are set to "1", and the copy pointer 786 set to the head of the original place from which data is migrated. The data of regions in which "1" is set are sequentially copied into the destination according to the copy pointer 786 as the copy pointer is updated. Just before the regions managed by the difference management information 785 are copied, the corresponding entries are set to "0".

When data within the region being migrated is updated during the copying of data, the corresponding entry of the difference management information 785 is set to "1". At the stage of having completed the copying of all regions, it is once checked to see if all entries within the difference management information 785 have changed to "0". If all entries are "0", the volume physical storage position main information 510 is updated, finishing the data storage position change processing. If some entries of "1" still remain, the regions corresponding to those entries are copied according to the above procedure.

The function to dynamically change the data storage positions may be attained by other means. In this case, the volume physical storage position management information 38 includes other management information for dynamic change of data storage positions in place of the volume data migration managing information 511.

FIG. 6 shows the physical storage device operation information 32 held within the storage apparatus 10. The physical storage device operation information 32 includes a set of a volume name 501 as an identifier for the volume that the storage apparatus 10 provides, a physical storage device name 502 as an identifier for the physical storage device that holds data of the volume having the volume name 501, a cumulative operation time 503 as a cumulative value from a certain time of the operation time for accessing data of the volume having the volume name 501 stored in the physical storage device 18 of the physical storage device name 502, a previous accumulative operation time 593 as a value of the cumulative operation time 503 last used for the calculation of an operation rate 594, and the operation rate 594 for indicating a ratio of the operation time to a certain time, and a previous accumulative operation time acquiring time 595 at which the previous accumulative operation time is acquired for the calculation of the operation rate 594.

The disk controller control portion 42 acquires a start time and end time of the operation of access to data of physical storage devices 18 by use of the disk controllers 16, decides what volume the accessed data corresponds to, and adds the operation time difference of the start time and end time, to the accumulative operation time 503 of the data having the corresponding volume name 501 and physical storage device name 502.

The physical storage position managing/optimizing portion 46 makes the following processing at constant intervals. It calculates/stores the operation rate 594 between the previous cumulative operation time acquiring time 595 and the current data acquiring time by using the accumulative operation time 503, previous accumulative operation time 593, previous accumulative operation time acquiring time 595 and current data acquiring time. Then, it causes the obtained accumulative operation time 503 to be stored in the previous accumulative operation time 593 and the current data acquiring time to be stored in the previous accumulative operation time acquiring time 595.

FIG. 7 shows the DBMS data information 38 held within the storage apparatus 10. The DBMS data information 38 includes DBMS schema information 711, data structure physical storage position information 712, DBMS execution history information 714, and DBMS data structure cache effect information 715.

The data included in the DBMS data information 38 require to use the data present on the DB host 80a, 80b. The storage apparatus 10 acquires the external information outside the storage apparatus 10 by using the host information setting program 130 that operates on the host information setting server 82. The host information setting program 130 acquires necessary information through the network by using the DBMS information acquisition/communication program 118 on the DB host 80a for executing a processing for collection of necessary information such as mapping information 106, and the DBMS information collection/communication portion 116 that is included within the DBMS 110b and executed to achieve the function equivalent to the DBMS information acquisition/communication program 118.

The host information setting program 130, after acquisition of information, makes data processing for setting information in the storage apparatus 10, if necessary, and transfers data through the network 79 to the storage apparatus 10. In the storage apparatus 10, the network interface control portion 50 confirms that necessary information has been sent, and delivers it to the physical storage position managing/optimizing portion 46, and after necessary processing, the information is stored in an appropriate place within the DBMS data information 36.

The host information setting program 130 may be executed on an arbitrary one of DB hosts 80a, 80b. Alternatively, the physical storage position managing/optimizing portion 46 may have the information collecting function of the host information setting program 130. In these cases, the transfer of information from the DB host 80a, 80b may be made through the I/O path 71. In this case, the storage apparatus 10 provides to the DB host 80a, 80b the special volume having a particular meaning when written in a particular region. The I/O path interface control portion 70, when something is written to this volume, decides that information transfer has occurred, and delivers the information to the physical storage position managing/optimizing portion 46, and after necessary processing, the information is stored in an appropriate place within the DBMS data information 38.

Two different methods of collecting information may be used: in one method, the storage apparatus 10, when requires information, issues a data transfer request to the outside; and in the other one, each time data is changed, the changed data is transmitted from the outside to the storage apparatus 10.

FIG. 8 shows the DBMS schema information 711 included in the DBMS data information 38. The DBMS schema information 711 includes DBMS data structure information 621, DBMS data storage position information 622, DBMS partitioned table/index information 623, DBMS index definition information 624, DBMS cache structure information 625 and DBMS host information 626.

The DBMS data structure information 621 is the information concerned with data structures that are defined in DBMS 110a, 110b. This information holds a set of a DBMS name 631 as an identifier for DBMS 110a, 110b, a data structure name 561 as an identifier for a data structure such as table, index, log or temporary table region within the DBMS 110a, 110b, a data structure type 640 indicating the type of data structure, a data structure data amount 641 indicating the total amount of data that can be obtained from the data storage position information and used by the data structure, and a maximum access parallelism 569 that is associated with the maximum degree of parallelism used when the data structure is accessed. At this time, some data structure has no value of maximum access parallelism 569.

The DBMS data storage position information 622 holds a set of the DBMS name 631 and data storage position management information 638 as the data storage position management information 555 in the DBMS.

The DBMS partitioned table/index information 623 is the information for managing some groups of data structure into which one table or indexes are divided or classed according to certain attribute values. This information holds a set of the DBMS name 631 as an identifier for DBMS 110a, 110b to which the partitioned data structures belong, a before-partition original data structure name 643 as an identifier for the non-partitioned previous data structure, the data structure name 561 as an identifier for the after-division data structure, and a partitioning method 644 for holding the dividing condition. Hereafter, when we simply say "data structure", it indicates the partitioned data structure unless otherwise noted.

The DBMS index definition information 624 holds a set of a DBMS name 361, an index name 635 as an identifier for index, an index type 636 indicating the type of the index, and coordinate table information 637 indicating the matching relation among index, table and attribute.

The DBMS cache structure information 625 is the information of cache of DBMS 110a, 110b, and holds a set of the DBMS name 631 and the cache structure information 556 in DBMS 110a, 110b.

The DBMS host information 626 is used to manage which one of the hosts executes the DBMS 110a, 110b having the DBMS name 631. This information holds a set of the DBMS name 631 and a host name 651 as an identifier for a DBMS executing host. The other information than the DBMS host information 626 of the DBMS schema information 711 are produced by acquiring necessary information from the schema information 114 that the DBMS 110a, 110b manages. The DBMS host information 626 is system structure information, and set up by the administrator.

FIG. 9 shows the data structure physical storage position information 712 included in the DBMS data information 38. The data structure physical storage position information 712 is used to manage the relation of the regions of the physical storage devices 18 within the storage apparatus with the data structures included in DBMS 110a, 110b that are stored in those regions. This information holds a set of the DBMS name 631 and data structure name 561 for specifying a data structure, the volume name 501 and volume logical block number 512 indicating the region to be accessed from the outside, and the physical storage device name 502 and physical block number 514 that indicate a storage position on the physical storage device 18. This information is produced by acquiring the DBMS data storage position information 622 and mapping information 106 from the outside of the storage apparatus 10, referring to the volume physical storage position main information 510, and combining the corresponding portions.

A method for sequential access is determined for each DBMS 110a, 110b. When the information 712 is produced, sorted data is produced so that the access order in which the sequential access is made can be maintained for each data structure specified by the DBMS name 631 and data structure name 561. Here, the types of the DBMS 110a, 110b are narrowed down, and the method of sequential access in the DBMS 110a, 110b is previously grasped by the program for producing the information 712, thus data being sorted in the sequential access order.

The sequential access method in the DBMS 110a, 110b according to this embodiment is performed as follows. When data of a certain data structure are sequentially accessed, the data file name 562 and file block number 563 in which the data structure is stored are sorted in ascending order, and accessing is executed in this order. As another method of deciding how to make sequential access, there is a method of accessing in ascending order in which pairs of the internal serial number and file block number 563 for managing data files are sorted. A method of sequential accessing should be determined according to DBMS 110.

FIG. 10 shows the query execution simultaneous access data structure count information 714 included in the DBMS data information 38. This information is the data indicating a set of data structures to be accessed at a time, and how many times query has been executed to simultaneously access the set of data structures during execution history on the basis of execution history information 122. This data is expressed by a set of the DBMS name 631, a data structure name A701 and data structure name B702 as a pair of data structure name 561 of data structures that can be accessed at a time, and a count 703 indicating the number of times that the pair of data structures are decided to have been accessed by analyzing the DBMS execution history 122. These data sets are sorted by the value of count 703.

The query execution simultaneous access data count information 714 is generated from the DBMS execution history 122. The entries of the information 714 are all erased first. When the DBMS 110a, 110b makes formulaic processing, grouping is first made according to the type, and it is checked how many times this type of processing has been made. Then, the query execution plan for each type is acquired from the DBMS 110a, 110b. A set of data structures to be accessed at a time is discriminated on the basis of the processing procedure shown by the query execution plan.

Thereafter, reference is made to the DBMS name 631/data structure name A701/data structure name B702 of the data count information 714. If there is already a set of corresponding data structures, the number of times the type of processing has been executed is added to the count 703. If there is no set of corresponding data structures, a new entry is added and the count 703 is set for the number of times the type of processing is executed.

When the DBMS 110a, 110b makes non-formulaic processing, a query execution plan is acquired for each executed query, a set of data structures to be accessed at a time is discriminated on the basis of the processing procedure shown by the query execution plan. Then, reference is made to the DBMS name 631/data structure name A701/data structure name B702 of the count information 714. If there is already a set of corresponding data structures, "1" is added to the count 703. If there is no set of corresponding data structures, a new entry is added, and the count 703 is set for "1".

The data structures that can be accessed at a time are discriminated from the query execution plan as follows. When a tree-structured index is accessed, it is decided that the tree-structure index data and the table data associated with the index are accessed at a time. When data is updated or inserted, it is decided that logs and other data are accessed at a time.

Although the following facts depend on the characteristics of DBMS 110a, 110b, there is, for example, RDBMS that forms a plan for executing a nested-loop join processing over multiple stages when the query execution plan is made, and executes those processing over multiple stages at a time. When this RDBMS is used, it can be decided that the table data and tree-structured index data associated with the table to be used for the nested-loop join processing over multiple stages are accessed at a time.

Thus, before the simultaneously accessed data based on the query execution plan is tried to discriminate, it is necessary to grasp the processing characteristics of DBMS 110a, 110b. Here, it is assumed that the intended types of DBMS 110a, 110b are narrowed down, and that a program for producing the information 714 has the function to grasp a set of simultaneously accessed data structures peculiar to the DBMS 110a, 110b.

The processing for generating the count information 714 from the execution history information 122 may be executed either within or outside the storage apparatus 10. When the storage apparatus 10 generates the count information 714, the storage apparatus 10 issues through the network 79 a request for DB host 80a, 80b or for a computer executing the DBMS front end program when the execution history information 122 is to be stored on that computer, to transfer the execution history information 122, and receives that information through the network 79.

Then, the above processing for generating count information 714 is executed. When this information is produced from the outside of the storage apparatus 10, the host information setting server 82, for example, acquires the execution history information 122 from DB host 80a, 80b or the computer that executes the DBMS front end program, and generates the count information 714. Thereafter, it transfers the generated count information 714 through the network 79 to the storage apparatus 10, and this information is stored in the DBMS data information 36.

In this embodiment, the execution history information 122 is not always needed to generate. At the time of generating the count information 714, when the DBMS 110a, 110b utilizes the data structures having no execution history information 122, these are neglected. Also, the count information 714 is dispensable.

FIG. 11 shows the DBMS data structure cache effect information 715 included in the DBMS data information 36. The DBMS data structure cache effect information 715 holds the results of deciding if the storage apparatus 10 can effectively or usefully make data structures be held in data cache. That is, it holds the DBMS name 631 and data structure name 561 for specifying a data structure, and cache effect information 733 indicating the result of deciding if the data structure has an advantageous effect when held in data cache. The value of the cache effect information 733 is specified by the administrator or estimated according to the following procedure.

Figure 12:
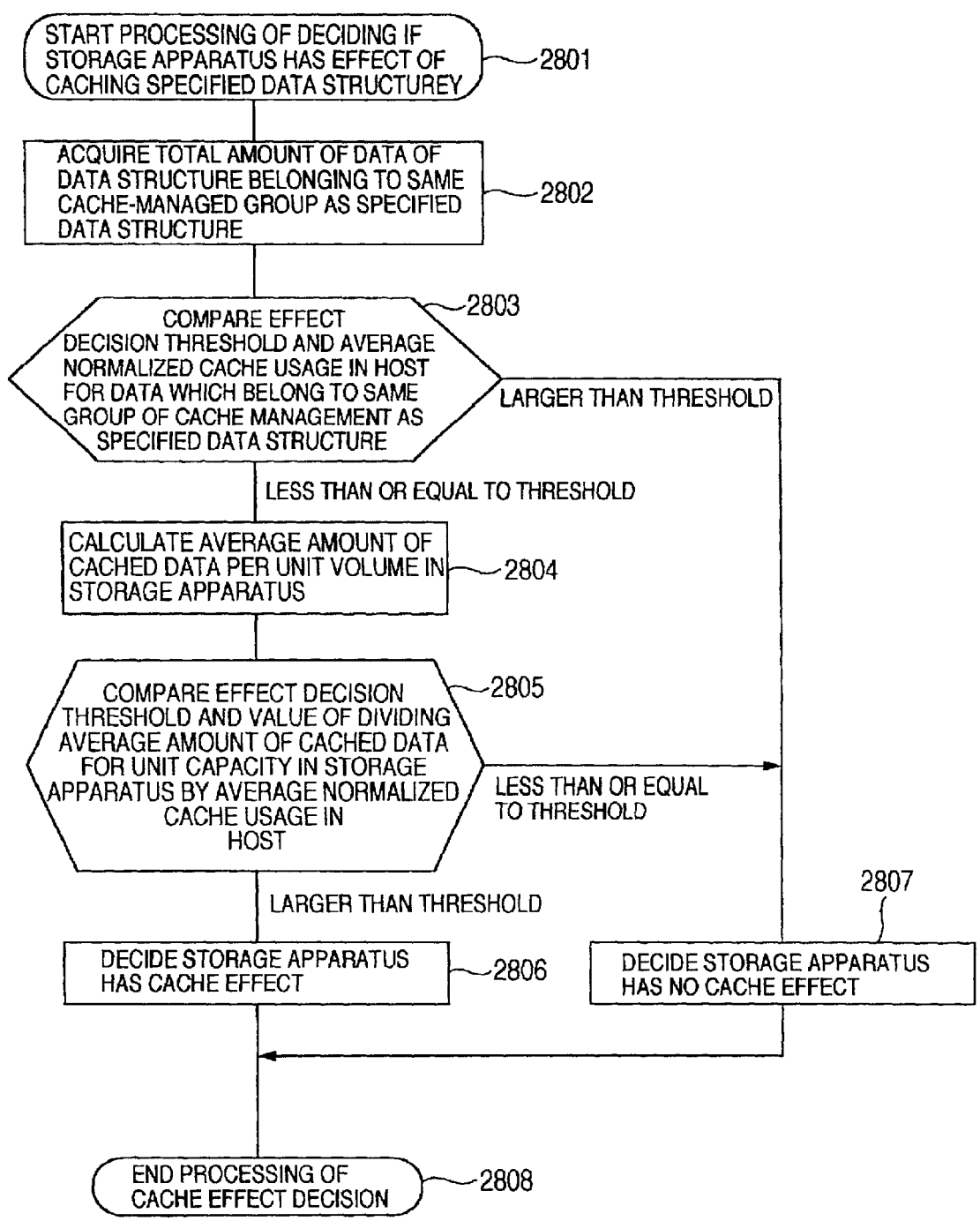
FIG. 12 is a flowchart of a processing for deciding if data of a structure specified in storage apparatus 10 has an advantageous effect when it is held in a data cache.

FIG. 12 is a flowchart for the decision of if the storage apparatus 10 can have an advantageous effect with which the specified data structure is held in data cache. There are two different criteria of judgment: "since the amount of host cache is much larger than the amount of data of specified data structure, access for reading frequently used data is not executed" and "since the amount of data cache of the storage apparatus 10 is smaller than the amount of host cache, and since data used so frequently that the amount of data cache of storage apparatus 10 has an advantageous effect on that data can be fully held on host cache, the effect of the data cache cannot be expected to increase even by caching the data read from the storage apparatus 10 by the storage apparatus 10".

The processing is started in step 2801. In step 2802, the total amount of data of data structure belonging to the same group of cache management as the specified data structure is estimated by referring to the DBMS cache structure information 625 and DBMS data structure information 621.

In step 2803, the average normalized cache usage in host for data which belong to the same group of cache management as the specified data structure, that is, the value of dividing cache size 566 in the DBMS cache structure information 625 for the above-mentioned group by the value calculated in step 2802 is determined, and this value is compared with a previously determined cache effect decision threshold. If the value is larger than the threshold, the processing goes to step 2807. If the value is less than or equal to the threshold, the processing goes to step 2804. This threshold is selected to be about 0.7.

In step 2804, the average amount of cached data for unit capacity is determined in the storage apparatus 10. This value can be calculated from the total capacity of data cache 28 of the storage apparatus and the total amount of volume provided to the outside. These amounts of capacity can be obtained by referring to the volume physical storage position management information 38 and data cache management information 34.

In step 2805, the value of dividing the average amount of cached data for unit capacity in the storage apparatus calculated in step 2804 by the average normalized cache usage in host calculated in step 2803 is determined. If this value is less than or equal to the cache effect decision threshold, the processing goes to step 2807. If it is larger than the threshold, the processing goes to step 2806. This threshold is selected to be about 0.7.

In step 2806, it is decided that the storage apparatus 10 has caching effect, and the processing goes to step 2808, where the cache effect decision processing ends.

In step 2807, the storage apparatus 10 is decided to have no caching effect, and the processing goes to step 2808 where the cache effect deciding processing ends.

Figure 13:
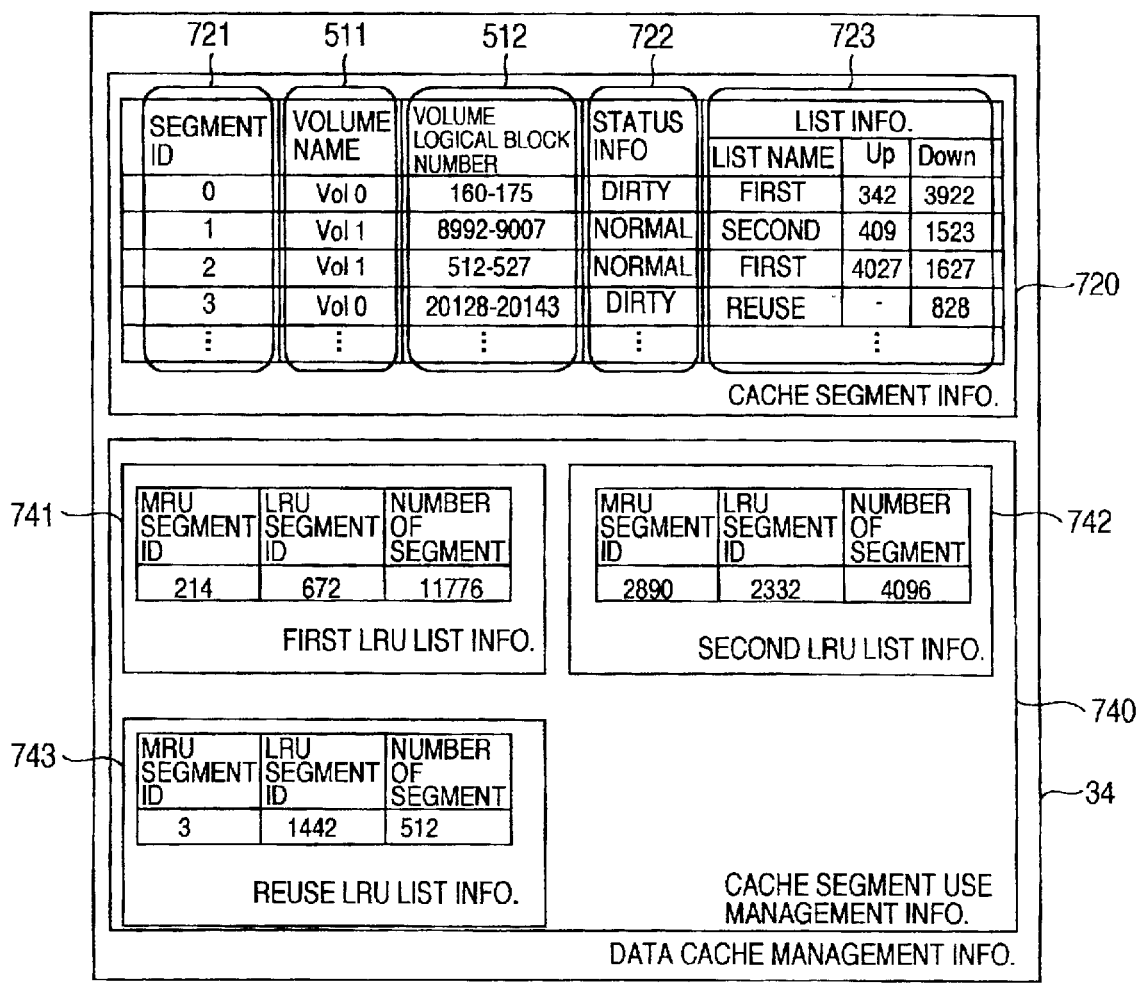
FIG. 13 is a diagram showing data cache management information 34 held within storage apparatus 10.

The storage apparatus 10 manages data cache by use of management units called segments as regions of a constant size. FIG. 13 shows the data cache management information 34 held within the storage apparatus 10. The data cache management information 34 includes cache segment information 720 indicating the status of segments of the data cache 28, and cache segment utilization management information 740 used for selecting the cache segments to be reused.

The cache segment information 720 includes a segment ID 721 as an identifier for segment, the volume name 511 and volume logical block number 512 indicating the data region stored in the segment, status information 722 indicating the status of segment, and list information 723 for use in segment reuse selection management as described later.

The segment status of status information 722 includes "normal" in which the same data as the data within segment is stored on the physical storage devices 18, "dirty" in which the latest data exists only within segment, and "invalid" in which no valid data exists within segment. The list information 723 includes an identifier of a list to which the segment currently belongs, and link information of the list. As illustrated, the list is a doubly-linked list.

The cache segment utilization management information 740 includes first LRU list information 741, second LRU list information 742, and reuse LRU list information 743 as management information for first LRU list, second LRU list and reuse LRU list of three different management lists for use in selecting cache segments to be reused.

The first LRU list information 741, second LRU list information 742 and reuse LRU list information 743 each include an MRU (Most Recently Used) segment ID as the head of list, an LRU segment ID as the rear end, and a number of segments in the list. These three different management lists are concerned with the processing for access requests from hosts, and how to use is explained at the same time when the access request processing is explained.

A description will be made of the processing for the data access request from host.

Figure 14:
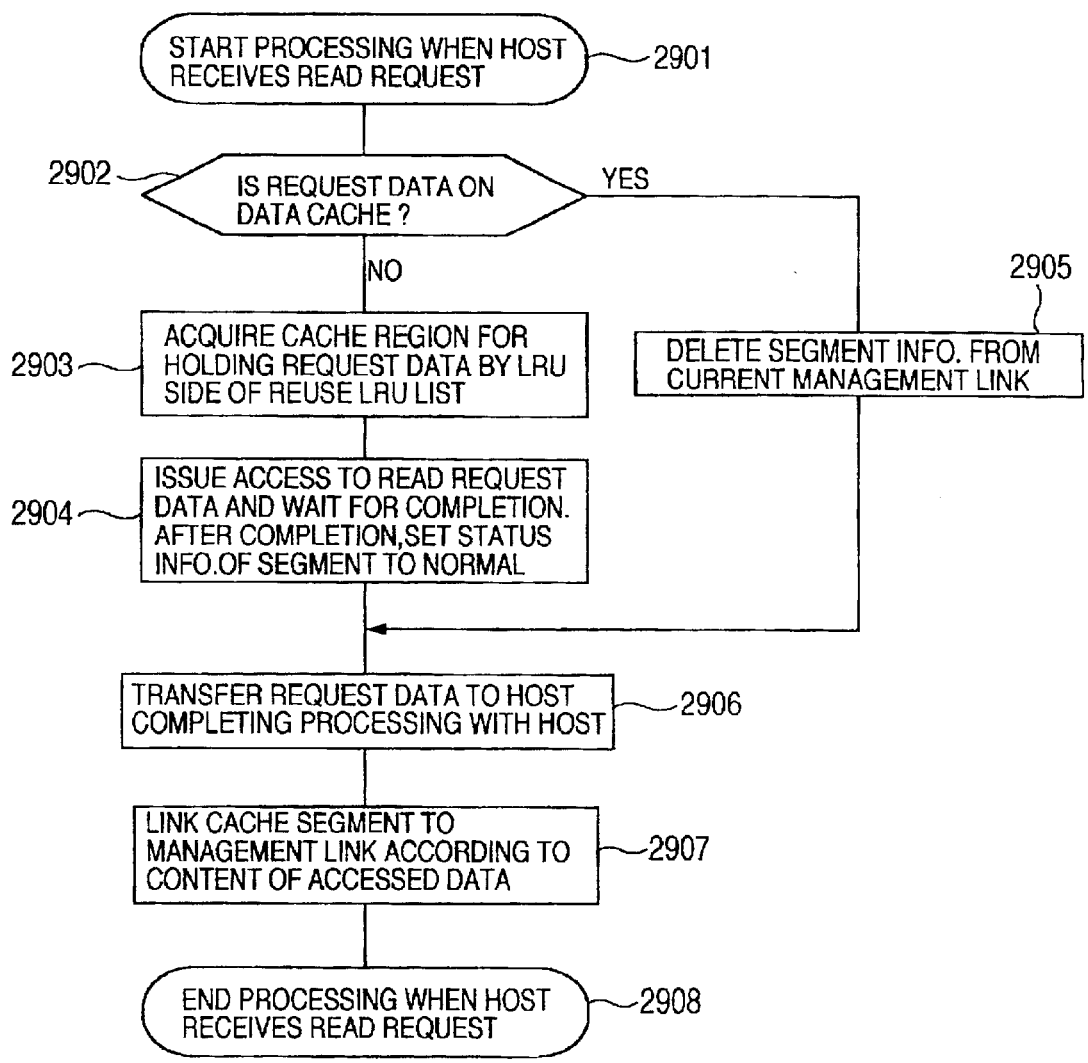
FIG. 14 is a flowchart of a processing to be made when the storage apparatus has received a data read request from a host.

FIG. 14 is a flowchart of the operations from when the storage apparatus 10 has received a request to read data from host. In step 2901, the I/O path interface 70 receives the read request from host, and the I/O path interface control portion 48 recognizes the request.

In step 2902, the cache control portion 44 checks if the data of the read request exists on the data cache 28 by referring to the data cache management information 34. If it exists, the processing goes to step 2905. If it does not exist, the processing goes to step 2903.

In step 2903, the cache control portion 44 acquires the cache region in which the data of the read request is to be stored. A necessary number of data holding cache segments on the LRU side of reuse LRU list are acquired from the status information of "normal" and deleted from the reuse LRU list. The reuse LRU list information 743 is updated according to that operation. In addition, the volume name 511 and volume logical block number of the cache segment information 720 are changed to those of the data to be written, and the status information 722 is set to "invalid".

In step 2904, the disk controller control portion 42 controls the physical storage devices 18 to read out the data of the read request, and waits for the completion of the reading out operation. After the reading operation, the corresponding status information 722 of the cache segment information 720 is set to "normal", and the processing goes to step 2906.

In step 2905, the cache control portion 44 deletes the segments holding the data of the read request from the management list currently linked.

In step 2906, the I/O path interface control portion 48 transfers the data of the read request from the segments to the host by way of the I/O path interface 70, completing the processing with the host.

In step 2907, the cache control portion 44 causes the segments holding the data of the read request to be linked to a proper management list according to the contents of the data to be accessed. The details of this processing will be described later.

In step 2908, the processing for the read request received from host ends.

Figure 15:
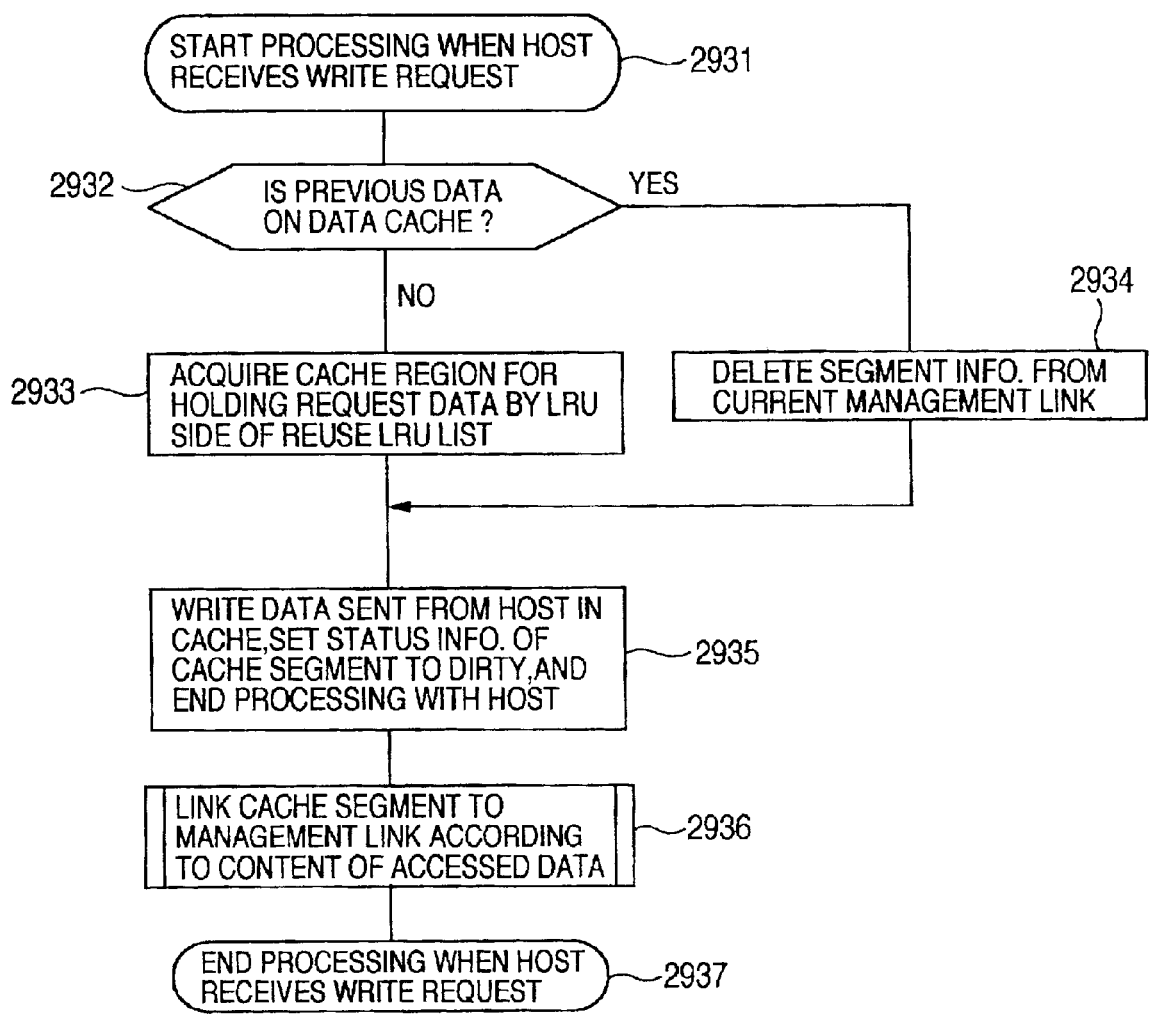
FIG. 15 is a flowchart of a processing to be made when the storage apparatus 10 has received a data write request from a host.

FIG. 15 is a flowchart of the operations for the write request that the storage apparatus 10 has received from host. In step 2931, the I/O path interface 70 receives the request to write data from the host, and the I/O path interface control portion 48 recognizes the request.

In step 2932, the cache control portion 44 checks if the segment holding the data of the write request exists on the data cache 28 by referring to the data cache management information 34. If it exists, the processing goes to step 2934. If it does not exist, the processing goes to step 2933.

In step 2933, the cache control portion 44 acquires the cache region for holding the data of the write request. A necessary number of data holding cache segments on the LRU side of the reuse LRU list are acquired from the status information of "normal", and deleted from the reuse LRU list. The reuse LRU list information 743 is updated according to that operation. The volume name 511 and volume logical block number of the cache segment information 720 are changed to those of the data to be written, and the status information 722 is set to "invalid".

In step 2934, the cache control portion 44 deletes the segment holding the data of the write request from the management list currently linked.

In step 2935, the I/O path interface control portion 48 controls the data of the write request to be written in the cache segment, the corresponding status information 722 of the cache segment information 720 to be set to "dirty", and the processing with host ends.

In step 2936, the cache control portion 44 controls the segment holding the data of the write request to be linked to a proper management list according to the contents of the data to be accessed. The details of this processing will be described later.

In step 2937, the processing for the write request received from host ends.

Figure 16:
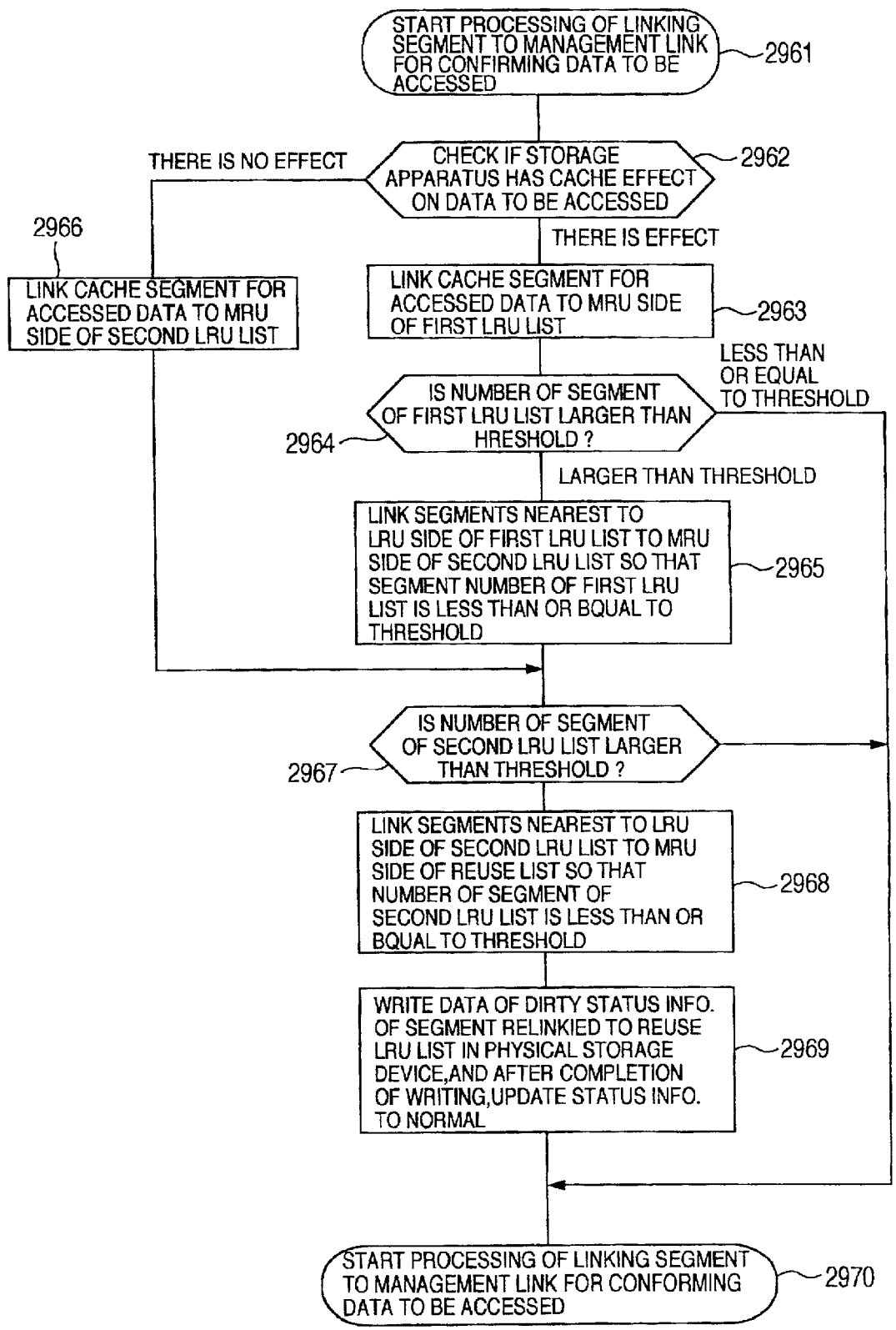
FIG. 16 is a flowchart of a processing to be made in order that a segment holding the data requested to be accessed can be linked to a proper management list according to the content of data of the access destination.

FIG. 16 is a flowchart of the operations of the cache control portion 44 for linking the segment holding the data of the write request to a proper management list according to the contents of the data to be accessed. In this processing, the data holding cache segment that is decided to have no cache effect in the storage apparatus 10 is linked to an easy-to-reuse place of the management list, thereby shortening the time in which the segments decided to have no cache effect are held on the data cache 28, and increasing the cache effect on other data.

Step 2961 starts the process for linking the segment holding the data of the access request to a proper management list according to the contents of the data to be accessed.

Step 2962 checks if there is a cache effect on the data to be accessed. The data structure physical storage position information 712 is referred to in order to find the DBMS 110a, 110b to which the data to be accessed belong, and the DBMS name 631 and the data structure name 561 as an identifier for the data structure. If there is no corresponding portion in the data structure physical storage position information 712, it is decided that there is a cache effect.

Then, it is decided if there is a cache effect on the data to be accessed by referring to the cache effect information 733 in the DBMS data structure cache effect information 715 corresponding to the already found DBMS name 631 and data structure name 561. If there is no corresponding entry in the cache effect information 733, it is decided that there is a cache effect. If it is decided that there is a cache effect, the processing goes to step 2963. If there is no cache effect, the processing goes to step 2966.

In step 2963, the cache segment holding the data to be accessed is linked to the MRU of the first LRU list, and the first LRU list information 741 is updated.

In step 2964, the number of segments linked to the first LRU list is confirmed by referring to the first LRU list information 741 so that it is checked if the value exceeds a previously selected threshold. If the segment number is smaller than or equal to the threshold, the processing goes to step 2970 where the processing ends. If it is larger than the threshold, the processing goes to step 2965.

In step 2965, the segment existing nearest to the LRU side of the first LRU is again linked to the MRU side of the second LRU list so that the segment number of first LRU list is smaller than or equal to the threshold, the first LRU list information 741 and the second LRU list information 742 are updated, and the processing goes to step 2967.

In step 2966, the cache segment holding the data to be accessed is linked to the MRU side of the second LRU list, the second LRU list information 742 is updated, and the processing goes to step 2967.

In step 2967, the number of segments linked to the second LRU list is confirmed by referring to the second LRU list information 742 so that it is checked if the value exceeds a previously selected threshold. If the number of segments is smaller than or equal to the threshold, the processing goes to step 2970 where the processing ends. If it is larger than the threshold, the processing goes to step 2968.

In step 2968, the segment that exists on the LRU side nearest to the second LRU is again linked to the MRU side of the reuse LRU list so that the number of segments of the second LRU list is smaller than or equal to the threshold, and the second LRU list information 742 and reuse LRU list information 743 are updated.

In step 2969, a request for the physical storage devices 18 to write data of the segments again linked to the reuse LRU list from the second LRU list in step 2968 and labeled "dirty" in the status information 722 of the cache segment information 720, is issued to the disk controller control portion 42, and the completion of this processing is waited for. After the completion of the writing, the corresponding status information 722 of the cache segment information 720 is changed to "normal", and the processing goes to step 2970.

In step 2970, the processing ends.

Figure 17:
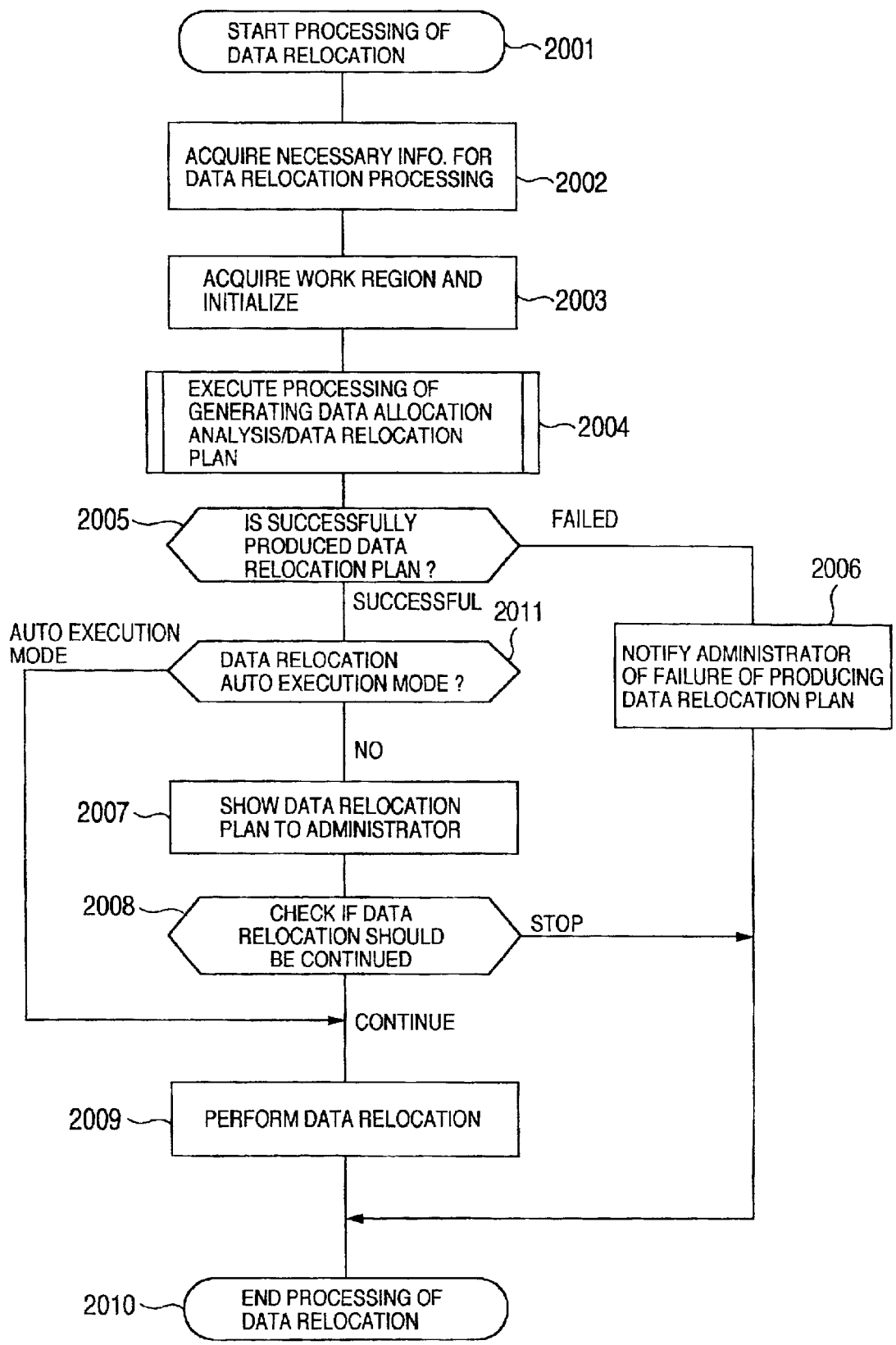
FIG. 17 is a flowchart of a data relocation processing to be executed within the storage apparatus 10.

FIG. 17 is a flowchart of the data relocation processing that the physical storage position managing/optimizing portion 42 executes. Here, two types of mode are considered: the mode in which the processing is started by the administrator's direction; and the data relocation automatic execution mode in which a data relocation plan production processing is automatically executed at a predetermined time, and then data migration is automatically performed in order to carry out the produced data relocation plan.

Since a plurality of different kinds of data allocation analysis/data relocation plan production processing can be executed as described later, a kind of processing to be made is specified and started. In addition, parameters, if necessary, are previously specified for the processing. When the administrator orders the system to make the processing, he/she orders the system to specify those together. When the processing is made in the data relocation automatic execution mode, the kind of processing and necessary parameters are previously selected together.

In step 2001, the data relocation processing is started. At this time, operations for the data allocation analysis/data relocation plan production processing are specified. Also, if necessary, parameters are selected.

In step 2002, the DBMS data information 38 necessary for the data relocation processing is acquired and stored by the method mentioned previously. This data collection can be previously performed irrespective of the start of the processing of step 2001. In this case, at this step it is confirmed if information is not changed during the time interval from when the information is acquired to the present time.

In step 2003, the work region is acquired and initialized. The work region is obtained by use of data relocation work information 670 shown in FIG. 19 and migration plan information 750 shown in FIG. 20. The details of the data relocation work information 670 and migration plan information 750, and the initial data production method will be described later.

In step 2004, the data allocation analysis/relocation plan production processing is executed. As described later, there are different methods for the data allocation analysis/relocation plan production processing as viewed from several standpoints. At this step, the process specified in step 2001 is performed. In addition, when parameters are received in step 2001, they are given to the processing of this step.

In step 2005, it is checked if the data relocation plan production processing of step 2004 has been successfully performed. If it is successfully made, the processing goes to step 2011. If it is failed, the processing goes to step 2006 where the administrator is informed of having failed to produce the data relocation plan, and the processing goes to step 2010 where the processing ends.

In step 2010, it is checked if the current processing is executed in the automatic execution mode. If it is executed in the automatic execution mode, the processing goes to step 2009. If not so, the processing goes to step 2007.

In step 2007, the data relocation plan produced in step 2004 is offered to the administrator. The offered administrator decides if the data relocation plan has no problem.

In step 2008, the administrator issues the instruction that the data relocation should be continued or not. If it is continued, the processing goes to step 2009. If not so, the processing goes to step 2010 where the processing ends.

In step 2009, the data relocation processing is performed according to the data relocation plan produced in step 2004. At this time, data are migrated from the specified volume regions to the regions within the specified physical storage devices 18 in the order indicated by a migration order 761 of the migration plan information 750. The method for achieving the migration processing function is as described above.

In step 2010, the data relocation processing has been completed.

Figure 18:
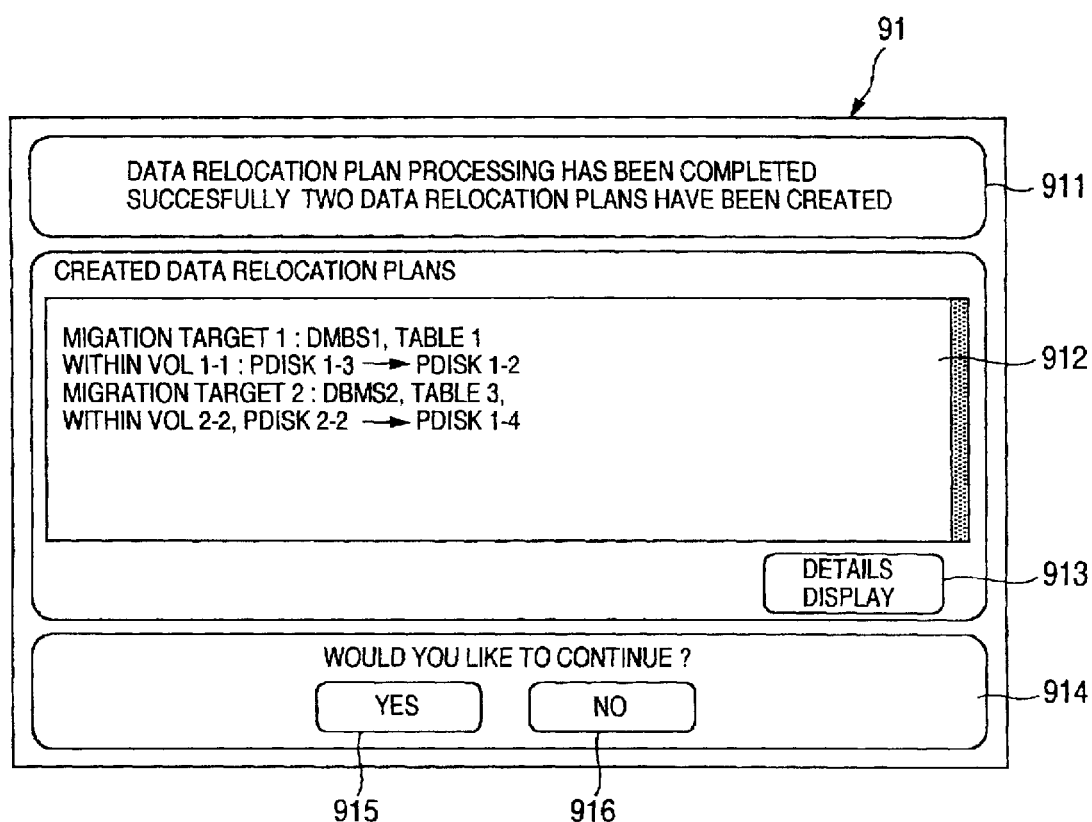
FIG. 18 is a schematic diagram showing an example of the data relocation plan displayed on the screen of an administrator's terminal.

The processing in steps 2005, 2007 and 2008 of FIG. 17 is displayed on the display screen 91 of the administrator's terminal 90 as for example shown in FIG. 18. In FIG. 18, a screen split region 911 displays the results of execution of step 2005 of FIG. 17, or messages of having succeeded in the generation of a data relocation plan and of the number of formed data relocation plans to the administrator. A screen split region 912 shows data relocation plans formed by the processing of step 2007 of FIG. 17 to the administrator. When the data relocation plans cannot be completely displayed within the screen split region 912, the keyboard 92 or mouse (not shown) is used to move the scroll bar to the right of region 912 so that the administrator can see the whole data relocation plans. If the administrator clicks on a button 913 by using the keyboard 92 or mouse, more detailed data relocation plans are displayed. A screen split region 914 urges the administrator to decide if the data relocation processing of step 2008 of FIG. 17 should be continued. If the administrator wants to continue the data relocation processing, click on a button 915 (Yes) of screen split region 914 to execute the processing of step 2009 of FIG. 17. If the administrator does not want to continue, click on a button 916 (No) of screen split region 914.

In other relocation plan production processing which will be described later, too, the same displaying as in FIG. 18 is performed.

Figure 19:
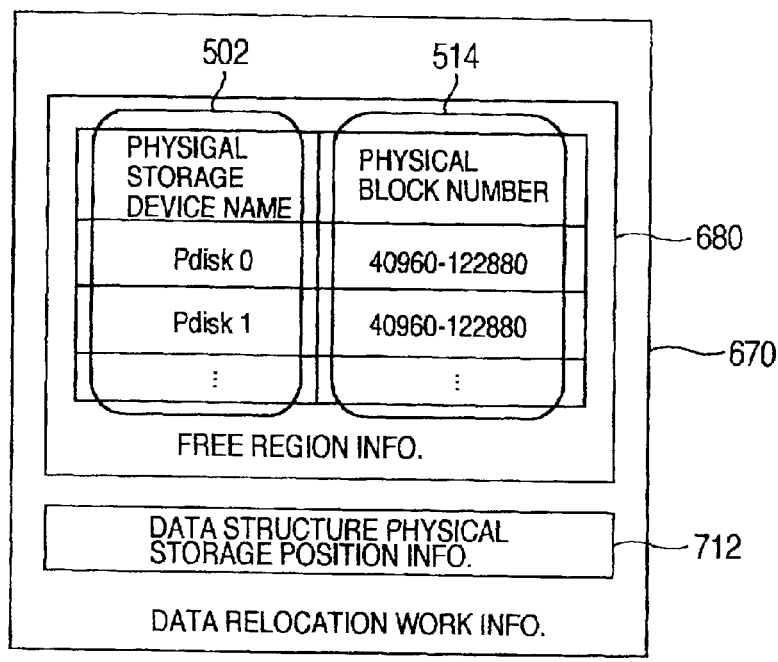
FIG. 19 is a diagram showing data relocation work information 670 to be used in the data relocation analysis/relocation plan generation processing.

FIG. 19 shows the data relocation work information 670 produced in step 2003. The data relocation work information 670 holds the copy of free region information 680 keeping up the data movable region and data structure physical storage position information 712. The free region information 680 holds a set of the physical storage device name 502 and physical block number 514 showing the data movable region.

The initialization of data is executed as follows. The free region information 680 is initialized by collecting the regions of "Empty" in the volume name 501 of the volume physical storage position main information 510. The data structure physical storage position information 712 directly copies the data the DBMS data information 38 has as they are. Since the values of these data are changed when the data relocation plan is formed, the data structure physical storage position information 712 is sure to produce the copy.

Figure 20:
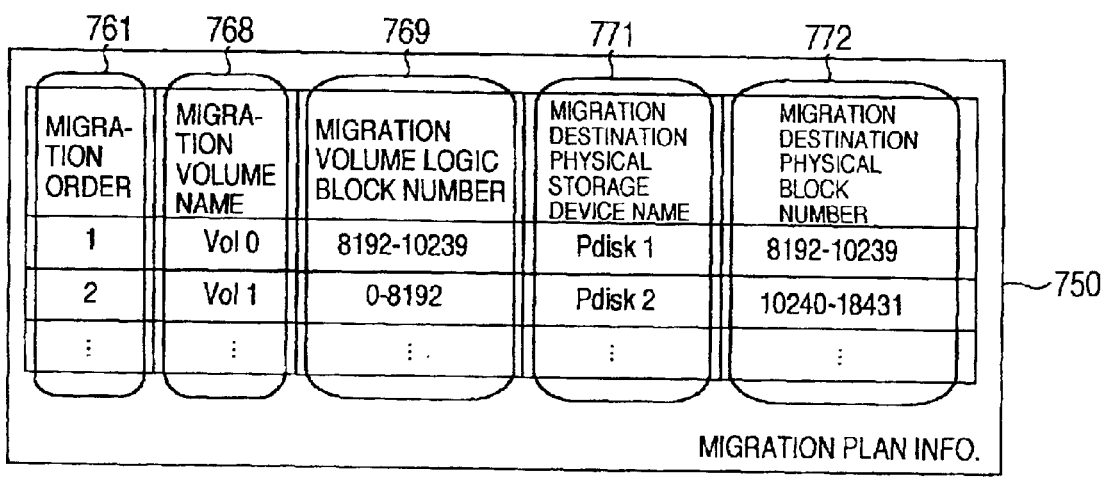
FIG. 20 a diagram showing migration plan information 750 for storing a data migration plan generated by the data allocation analysis/relocation generation processing.

FIG. 20 shows the migration plan information 750 which stores the data migration plan produced by the data allocation analysis/data relocation plan production processing that is executed in step 2004. The migration plan information 750 holds a set of the migration order 761 for indicating the order in which the migration instructions are executed, a migration volume name 768 and migration volume logical block number 769 for indicating the volume having the data to be migrated and the data region, and a migration destination physical storage device name 771 and migration destination physical block number 772 for indicating the physical storage devices and the storage region to which the data are migrated. This information is initialized not to have any data.

A description will be described of the data allocation analysis/data relocation plan production processing that is executed in step 2004. There are some kinds of the processing. The feature common to all the processing is to sequentially form data migration plans for data relocation. Therefore, the migration order has some significance. The order is held in the migration order 761 of the migration plan information 750, and data is migrated in that order when the data relocation is performed.

In addition, in order to make sequential processing, it is necessary to determine a method of migrating next data based on the allocation of data after data migration. Thus, each time a data migration plan is formed, the data relocation work information 670 is updated for the allocation after data migration.

The data migration plan at the time of data relocation plan production is formed as follows. The continuous movable regions of more than the amount of data desired to migrate are grasped from the information of data relocation work information 670, and some of the regions are selected and checked if they satisfy the setting conditions and the restrictions which will be described later. If they satisfy, those regions are selected as the place to be migrated to. If they do not satisfy, other regions are selected, and again checked if they satisfy those conditions.

The processing is repeated until the regions satisfying the setting conditions and restrictions are found or destination of continuous regions of more than the amount of all data desired to migrate are confirmed not to satisfy the setting conditions and restrictions. If all regions do not satisfy the setting conditions and restrictions, the data migration plans are decided to have failed to produce, and the processing ends.

At this time, what is important is that the improper data allocation should be avoided after the migration. Particularly in RDBMS, since it is highly likely that particular data are accessed at a time, it is necessary to arrange those data on different physical storage devices 18. Thus, when a migration plan is formed on all case as described later, the data structures included in the data to be migrated and the data structures included in the data stored in the same physical storage device 18 as the migration destination are examined, and it is checked if the logs and other data, temporary table region and other data, and table data and tree-structured index data produced in association therewith are both respectively placed on the same physical storage device 18 after the migration of data. If each pair is placed in the same device, that allocation plan is decided not to be usable.

The regions of any one of physical storage devices 18 in which certain data structures are stored and inversely data structures to which the data stored in the regions of any one of physical storage devices 18 correspond can be grasped by the data structure physical storage position information 712 of the data relocation work information 670.

Figure 21:
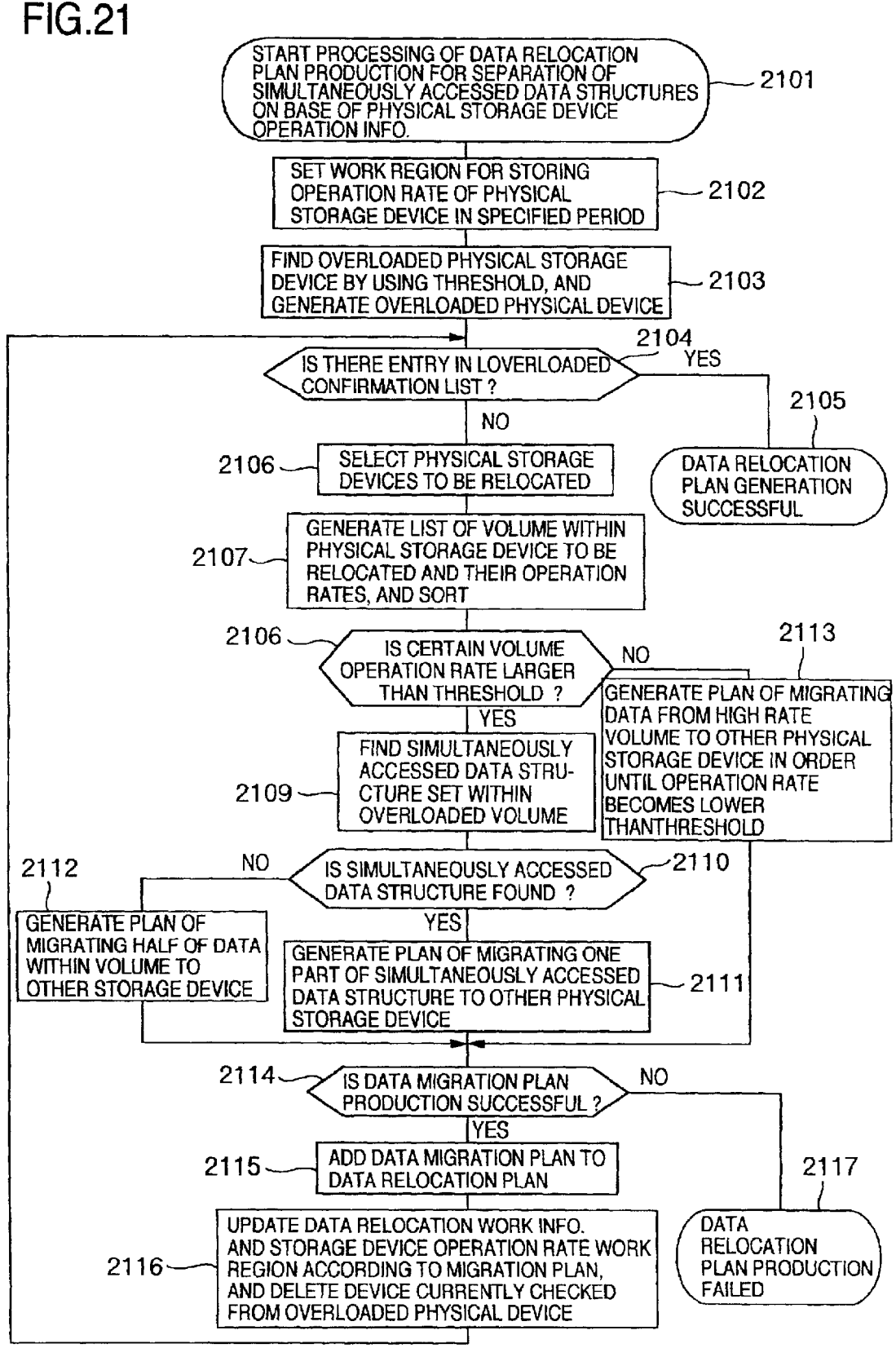
FIG. 21 is a flowchart of a data relocation plan generation processing for separating a simultaneous access execution data structure based on physical storage device operation information 32.

FIG. 21 is a flowchart of the data relocation plan generating processing for separating the simultaneously accessed data structures on the basis of the physical storage device operation information 32, as the first data allocation analysis/data relocation plan production processing. In this processing, when the physical storage device 18 of which the operation rate exceeds a threshold is decided to be in the disk-bottleneck state, a data migration plan is generated to eliminate it. This processing is expected to generate a higher precision data relocation plan since it can grasp the problems on the basis of actual measurement and find the countermeasure. This processing can be most easily used.

In step 2101, the processing is started. Before starting this processing, the periods in which the operation rates of storage devices are to be referred to are specified.

Step 2102 acquires a work region for storing a set of the identifiers of physical storage devices 18 and the operation rates of the physical storage devices 18 in the specified periods, refers to that physical storage device operation information 32 to set the information, and sorts the information in descending order according to the operation rates of the physical storage devices 18. Since different volumes of even data stored in the same physical storage device 18 are separated to acquire different operation rates within the physical storage operation information, it is necessary to find the rates of operation of the physical storage devices 18 as the total of those values.

Step 2103 generates the overloaded physical device list of physical storage devices 18 of which the operation rates exceed the threshold on the basis of the result of the sorting of step 2102. The entries in this list are also maintained in the same order as the rates of operations are arranged in descending order.

Step 2104 checks if an entry exists in the overloaded physical device list. If no entry exists, it is decided that there is no overloaded physical storage device 18, and the processing goes to step 2105 where the data relocation plan generation processing is decided to be successful, and ends. If there is an entry, the processing goes to step 2106.

Step 2106 selects the physical storage device 18 of which the operation rate is the highest of the overloaded physical device list as the device 18 to be relocated.

Step 2107 generates a list of volumes within the physical storage devices 18 decided to be relocated, and their rates of operation by referring to the physical storage device operation information 32, and sorts them in descending order of operation rates.

Step 2108 checks if the operation rates of volumes within the list exceed a predetermined threshold. If the operation rates of all volumes do not exceed the threshold, the processing goes to step 2113. If the operation rate of a certain volume exceeds the threshold, the processing goes to step 2109.

Step 2109 makes the processing of finding if the volume of which the operation rate exceeds the threshold holds pairs of data that are included in the physical storage apparatus 18 to be checked and that can be accessed at a time, or a pair of log and other data, a pair of temporary table region and other data, and a pair of table data and tree-structured index data produced in association with that table data.

Step 2110 checks the results obtained in step 2109. If there is a pair of data structures that are likely to be accessed at a time, the processing goes to step 2111. If there are no pair of data structures that are likely to be accessed at a time, the processing goes to step 2112.

Step 2111 generates a data migration plan in order that data belonging to a pair of data structures that are likely to be simultaneously accessed can be stored in different physical storage devices 18, and the processing goes to step 2114.

In Step 2112, the data within the volume to be currently checked are divided into halves according to the logical block number, and a data migration plan for migrating one of them to another physical storage device 18. Then, the processing goes to step 2114.

In Step 2113, a data migration plan for migrating all data that constitute the volume stored in the physical storage device 18 that is currently being checked are migrated to other physical storage devices 18 in the order of higher operation rates of the volume until the operation rate of that physical storage device 18 is reduced to be smaller than the threshold, and the processing goes to step 2114.

When the places to which data are migrated are found in steps 211, 2112 and 2113, the after-migration operation rates of the storage devices to which data are migrated are predicted. In addition, a data migration plan for migrating data to such a place that the operation rate after addition does not exceed the threshold is generated considering that the operation rate of the physical storage device 18 to which data is migrated is increased, because of the data migration, by the amount corresponding to the change of revised operation rate of the volume on the storage device 18 that includes the data migrated when the performance differences between the physical storage devices 18 are known, or by the amount corresponding to the change of unmodified operation rate of the volume on the storage device 18 that includes the data migrated when the performance differences are not known.

As to the value of operation rate added to migration destination, although the ratio of the value of migrated data to the total rate of operation can be considered, it is here assumed that only the data to be migrated are concentrically accessed to, considering the bias in access to data.

Step 2114 checks if the data migration plan has been successfully formed. If it is failed, the processing goes to step 2117 where the processing ends with the reason because the data relocation plan has been failed to form. If it is successful, the processing goes to step 2115.

Step 2115 adds the formed data migration plan to the migration plan information 750, and the processing goes to step 2116. In step 2116, the data relocation work information 670 is modified according to the formed data migration plan, and the values of operation information that have been produced in step 2102 are changed to the above decided after-migration rates of operation, that is, the operation rate of the destination physical storage device in the operation information is increased by above-described value. Then, the physical storage device 18 being currently checked is removed from the overloaded physical device list, and the processing goes back to step 2104 where the next checking is performed.

Next, a flowchart will be shown of the second data allocation analysis/data relocation plan production processing, or the processing for separating the simultaneously accessed data structures by use of the query execution simultaneous access data structure count information 714. In this processing, a data relocation plan is formed to acquire sets of data that are likely to be simultaneously accessed, from the count information 714, and to place them in different physical storage devices 18.

Figure 22:
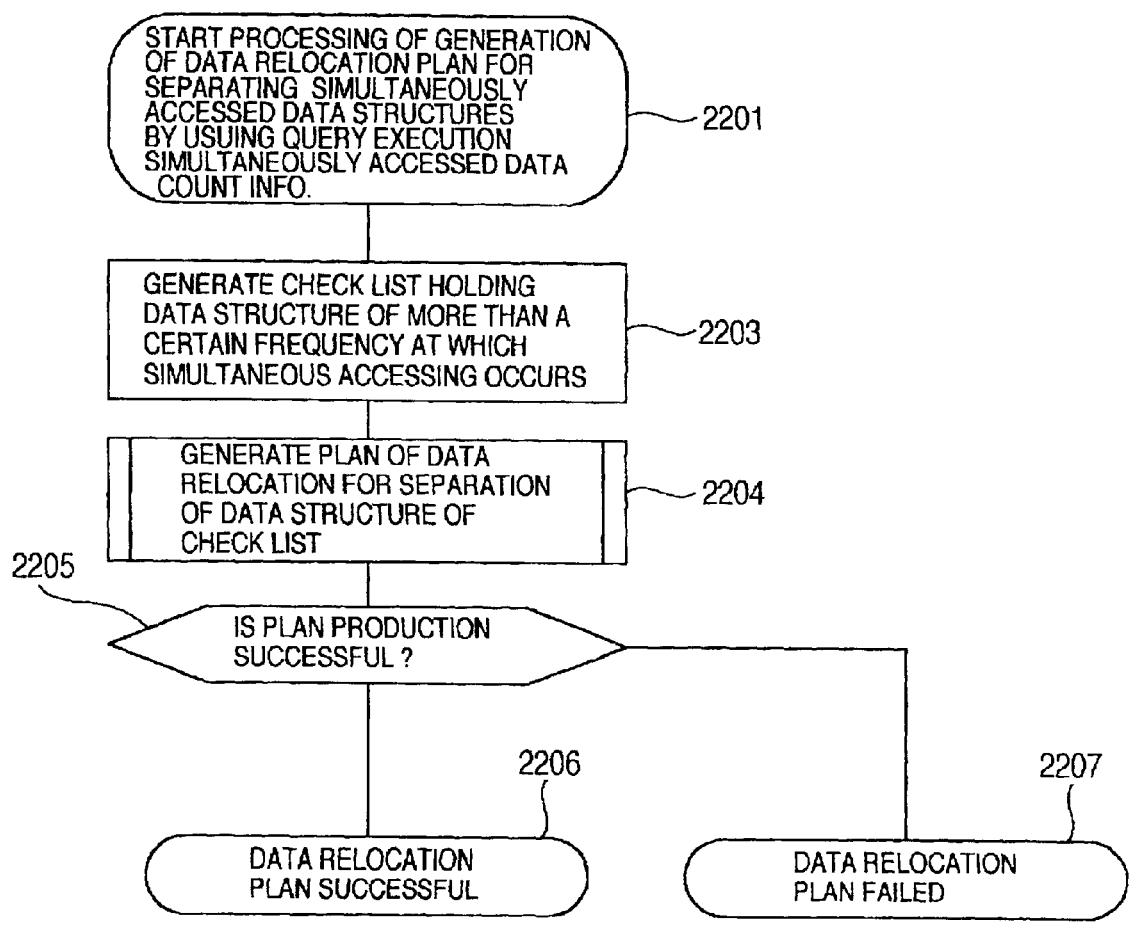
FIG. 22 is a flowchart of a data relocation plan generation processing for separating a simultaneous access execution data structure that uses query execution simultaneous access data count information 714.

FIG. 22 is a flowchart of a data relocation plan production processing for separating the simultaneously accessed data structures by use of the query execution simultaneous access data count information 714. In step 2201, the processing is started. Step 2203 finds a set of the data structures of which the count 703 is more than a certain proportion to the total value of count 703 over all entries, and the DBMS 110a, 110b belonging thereto, and makes them be stored as a check list.

Step 2204 generates a data relocation plan by which the set of data structures of the check list found in step 2203 is stored in different physical storage devices 18, and the processing goes to step 2205. The details of step 2204 will be described later with reference to FIG. 23. Step 2205 checks if the data relocation plan has been successfully generated in step 2204. If it is successful, the processing goes to step 2206 where the data relocation plan production processing ends with the reason that plan production succeeded. If it is failed, the processing goes to step 2207 where the plan production processing ends with the reason that plan production failed.

Figure 23:
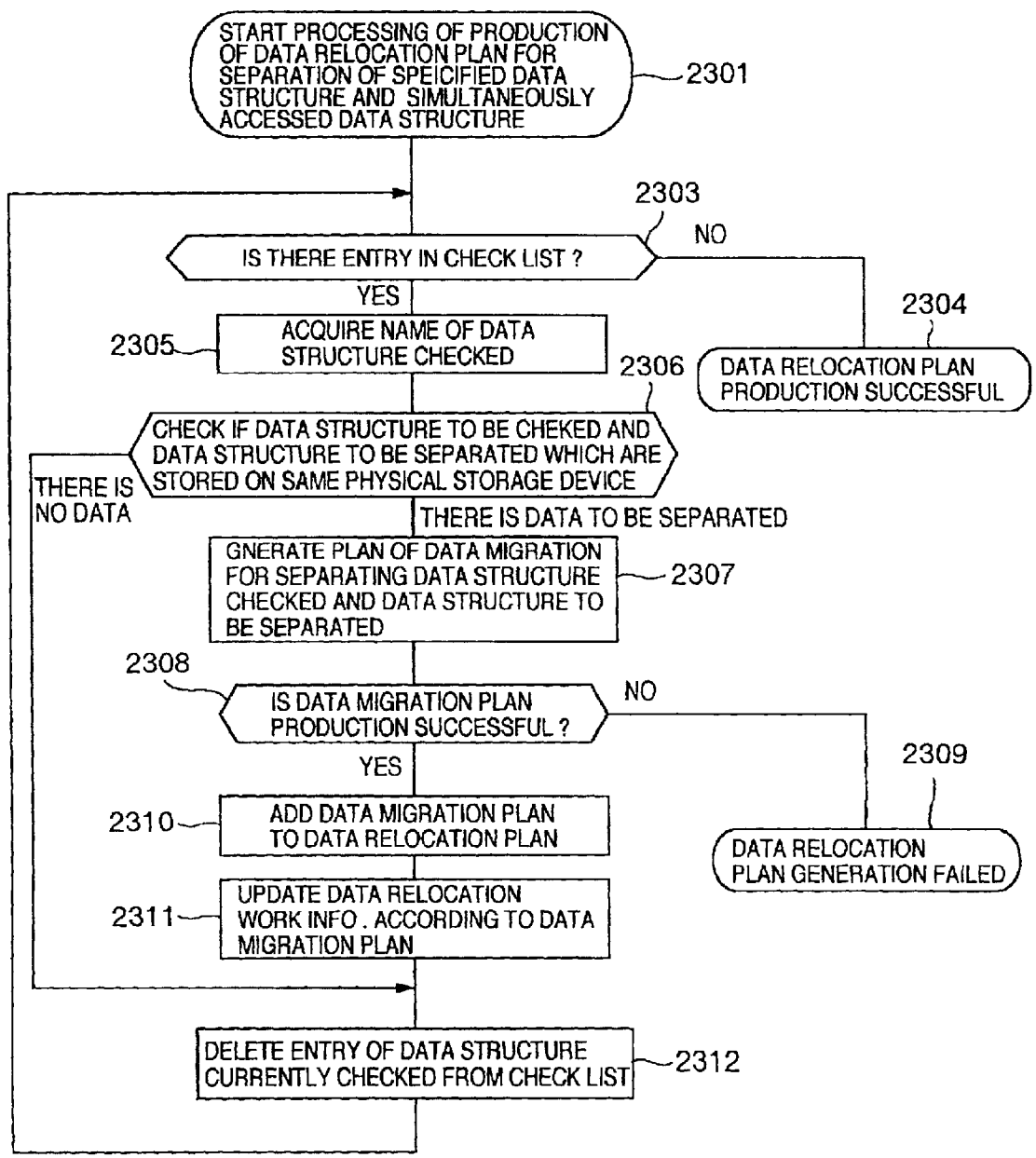
FIG. 23 is a flowchart of a processing for generating a data relocation plan for separating a set of a specified data structure and another data structure that is highly likely to be accessed together with the specified structure.

FIG. 23 is a flowchart of a data relocation plan production processing for separating specified data structures and a set of data structures that are highly likely to be simultaneously accessed together with the specified data structures. When this processing is started, a check list is given which includes a pair of set of data structure names whose data should be separated from the same physical storage devices 18.

In step 2301, the processing is started. Step 2303 checks if there is an entry in the check list. If there is not, the processing goes to step 2304 where the processing ends because the plan has been successfully produced. If there is an entry, the processing goes to step 2305.

Step 2305 acquires from the check list one data structure name to be checked, a set of names of DBMS belonging to that structure name, a set of the data structure names to be separated, and a set of the names of DBMS belonging thereto, and the processing goes to step 2306.

Step 2306 checks if the data structure to be checked and the data structures to be separated are stored on the same physical storage device. This checking can be performed by referring to the data structure physical storage position information 712 of the data relocation work information 670. If both data structures all exist on different physical devices, the processing goes to step 2312. If both structures exist on a certain physical storage device, the processing goes to step 2307.

Step 2307 generates a data migration plan for separating the portion in which both data structures exist on the same physical storage device. Step 2308 checks if the data migration plan has been successfully produced. If it is successfully produced, the processing goes to step 2310. If it is failed, the processing goes to step 2309 where the processing ends because the relocation plan has been failed to produce.

Step 2310 makes the formed data migration plan be stored in the migration plan information 750. Step 2311 updates the data relocation work information 670 according to the produced data migration plan, and the processing goes to step 2312.

Step 2312 deletes from the check list the entries of the set of data structures being currently checked, and the processing goes to step 2303.

Figure 24:
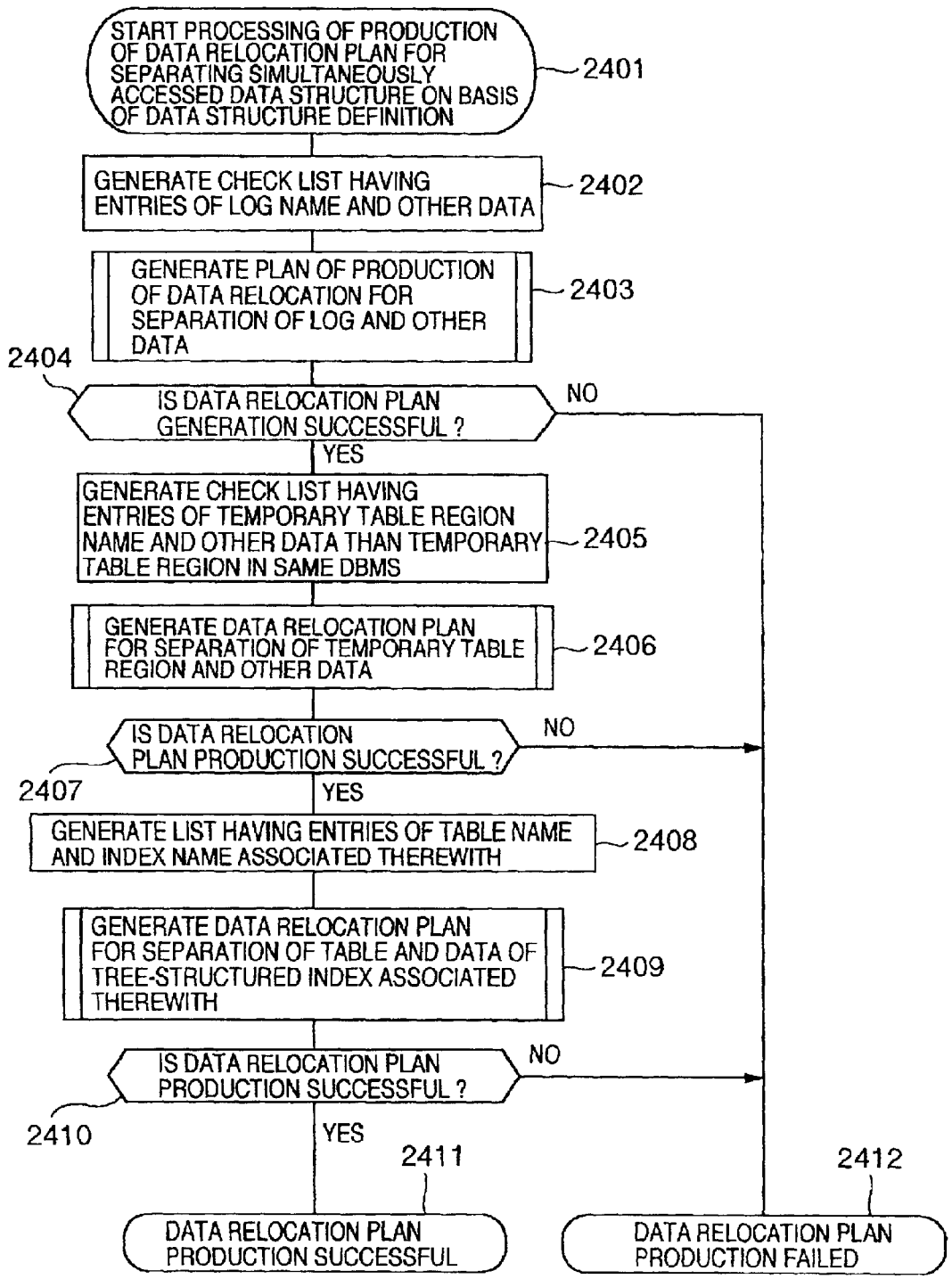
FIG. 24 is a flowchart of a data relocation plan generation processing for separating a simultaneous access execution data structure based on the definition of data structures.

FIG. 24 is a flowchart of the third data allocation analysis/data relocation plan production processing, or the processing for separating the data structures that are likely to be simultaneously accessed, on the basis of the data structure definition. This processing checks if there is a portion in which pairs of log and other data, temporary table region and other data, and table data and tree-structured index data produced associated therewith are stored on the same physical storage device 18. If there is such a portion, a data relocation plan is generated for solving this problem.

In step 2401, the processing is started. Step 2402 acquires a set of the data structure name 561 of all logs and the DBMS name 631 of DBMS 110a, 110b by referring to the DBMS data structure information 621. Then, this step generates a check list of the data structure name of logs and the data structure names of other than logs for separating them, and the processing goes to step 2403. Step 2403 executes the data relocation plan production processing for data structure separation that is started from step 2301 by using the check list generated in step 2402.

Step 2404 checks if the data relocation plan has been successfully produced in step 2403. If it has been successfully produced, the processing goes to step 2405. If it has been failed, the processing goes to step 2412 where the processing ends with the reason because the plan has been failed to produce.

Step 2405 acquires a set of the data structure name 561 of all temporary table regions and the DBMS name 631 of DBMS 110a, 110b using the name by referring to the DBMS data structure information 621. Then, this step produces a check list of the data structure name of the data structure and the data structure names of other than temporary table regions for separating them, and the processing goes to step 2406. Step 2406 executes the data relocation plan production processing for the data structure separation that is started from step 2301 by using the check list produced in step 2405.

Step 2407 checks if the data relocation plan production processing in step 2406 has been successfully executed. If it has been successfully made, the processing goes to step 2408. If it has been failed, the processing goes to step 2412 where the processing ends with the reason because the data relocation plan production processing has been failed.

Step 2408 refers to the DBMS index definition information 624 to acquire a set of all tree-structured index names 635 and the DBMS names 631 of DBMS 110a, 110b using those index names, and a set of the data structure names of the corresponding table and the DBMS names 631 of DBMS 110a, 110b using those structure names from the coordinate table information 637. Then, this step generates a check list of a set of data of those index and table, and the processing goes to step 2409. Step 2409 executes the data relocation plan production processing for data structure separation that is started from step 2301 by using the check list produced in step 2408. Step 2410 checks if the data relocation plan production processing has been successfully executed in step 2409. If it has been successfully executed, the processing goes to step 2411 where the processing ends with the reason because it has been successfully executed. If it has been failed, the processing goes to step 2412 where the processing ends with the reason because it has been failed.

Figure 25:
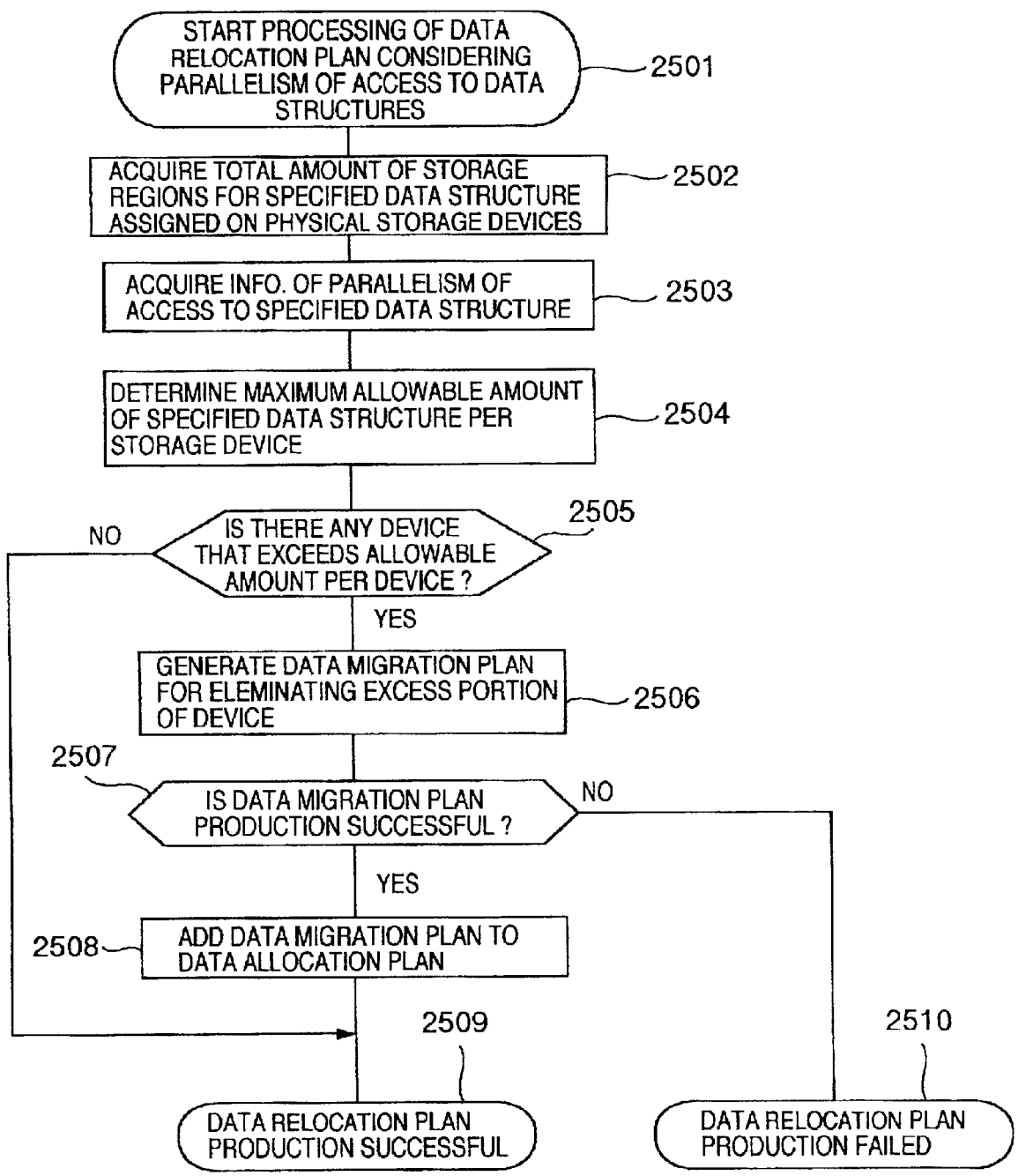
FIG. 25 is a flowchart of a data relocation plan processing that considers the access parallelism for the same data structure of particular table and index.
Figure 26:
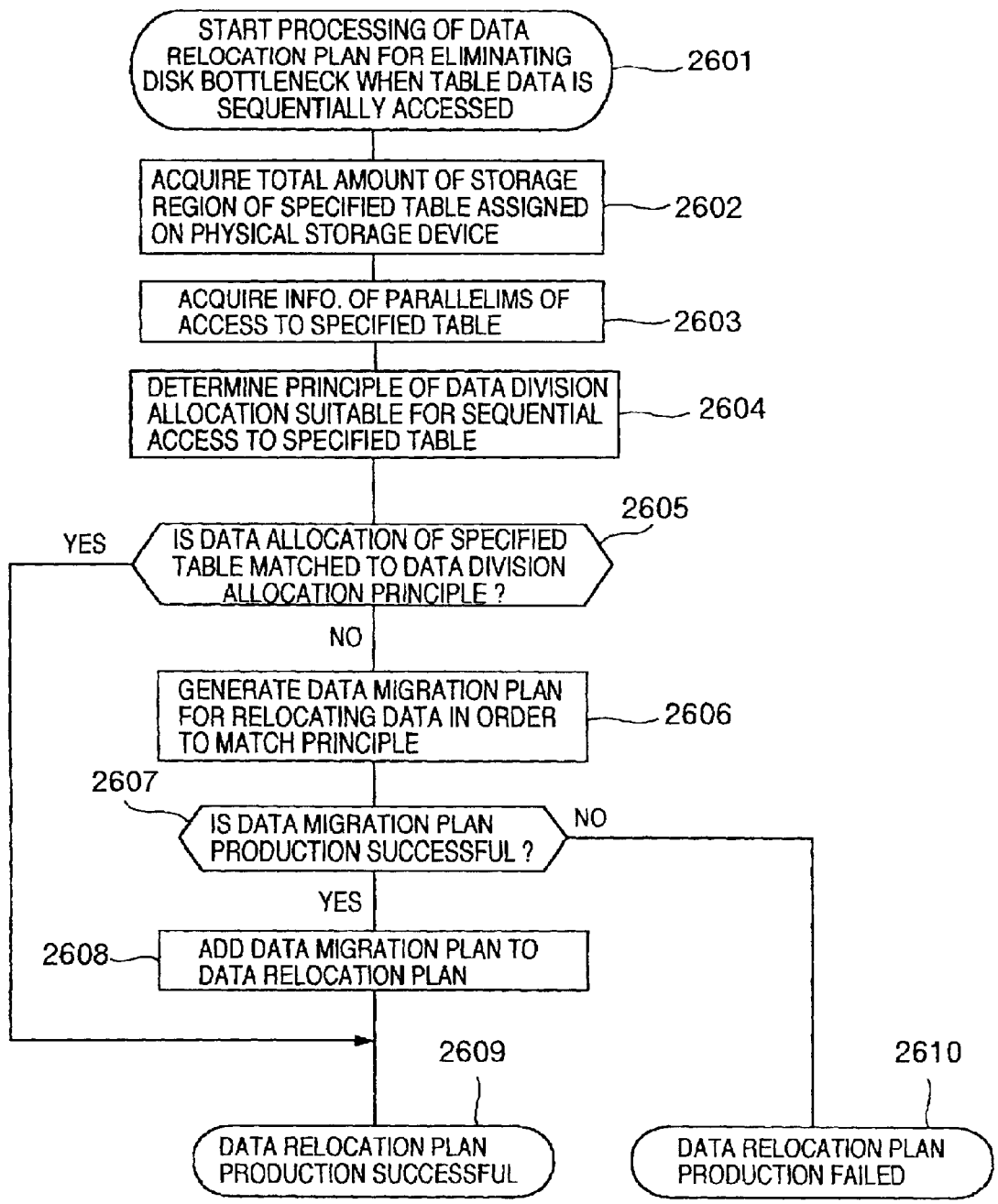
FIG. 26 is a flowchart of a data relocation plan generation processing for eliminating disk bottleneck at the time of sequential access to particular table data.

FIG. 25 is a flowchart of the fourth data allocation analysis/data relocation plan production processing, or the processing considering the degree of access parallelism to the same data structure of particular table and index. This processing makes data relocation for alleviating the disk bottleneck by considering the degree of parallelism of the processing at the time of accessing data randomly. When this processing is executed, the data structures to be checked for the data relocation are specified as a set of DBMS name 631 and data structure name 561.

In step 2501, the processing is started. Step 2502 estimates the total amount of use of storage regions of a specified data structure assigned on the physical storage devices. This value is determined by referring to the data structure data amount 641 of DBMS data structure information 621.

Step 2503 acquires the maximum access parallelism 569 of the specified data structure by referring to the DBMS data structure information 621.

Step 2504 estimates the total amount of use of storage regions of specified data structure of step 2502 divided by the maximum access parallelism 569 obtained in step 2503 as the maximum allowable amount of the specified data structure to be assigned on one physical storage device 18. Under this condition, the specified data structures can be distributively stored in physical storage devices 18 of the number corresponding to more than the maximum access parallelism 569 without being heavily weighted to particular physical storage devices 18. Even though data of a data structure are accessed randomly with the maximum access parallelism 569, disk bottleneck is less apt to occur. Considering the actual access characteristics, the maximum allowable value of assignment may be increased or decreased from the estimate obtained by this method.

Step 2505 uses the data relocation work information 670 to check if the data of a specified data structure are assigned on one physical storage device 18 so as to exceed the maximum amount determined in step 2504. If such data is not present, the processing goes to step 2509 where the processing ends with the reason because the data relocation plan has been successfully generated. If such data is present, the processing goes to step 2506.

Step 2506 generates a data migration plan for eliminating the data assigned on one physical storage device 18 so as to exceed the maximum amount determined in step 2504. At this time, the amount of data migration to be allowed for in the migration plan production is required to be more than a surplus that the assignment of the specified data structure on the current physical storage device 18 exceeds the maximum amount determined in step 2504. Even in the physical storage device 18 to which data are migrated, it is necessary for the data not to exceed the maximum amount determined in step 2504.

Step 2507 checks if the data migration plan production processing of step 2506 has been successfully made. If it has been successful, the processing goes to step 2508. If it has been failed, the processing goes to step 2510 where the processing ends with the reason because the plan production has been failed.

Step 2508 stores the produced data migration plan in the migration plan information 750, and the processing goes to step 2509 where the processing ends with the reason because the data relocation plan has been successfully produced.

FIG. 25 is a flowchart of a data allocation analysis/data relocation plan production processing, or the processing for eliminating the disk bottleneck at the time of sequential access to particular table data. When this processing is executed, the table to be checked for data relocation is specified as a set of DBMS name 631 and data structure name 561.

Although the types of DBMS 110*a*, 110*b* to be used are narrowed down as described above, the data structure physical storage position information 712 are sorted and stored in the order of sequential access, and thus the sequential accessing method is known.

In addition, when the sequential access operations are executed in parallel, it is assumed the regions with the sorted order on sequential access operation above-described are equally divided by access parallelism.

It is not always practical to place one access region on the same physical storage device 18 after the division of region by this parallel access. If the access region after division is stored on one physical storage device so as to be continuous therein over more than a constant amount, it is decided to be satisfactory. However, pair of data which are not accessed continuously in any case, and belong to the access regions classified differently after division, access operations to them are likely to collide at the time of parallel sequential access. Thus, a guiding principle that such pair of data should be stored in different physical storage devices 18 is provided, and data are placed according to this principle, thereby enhancing the performance of sequential access.

In step 2601, the processing is started. Step 2602 estimates the total amounts of use of storage region assigned on physical storage devices of a specified table. These values are obtained by referring to the data structure data amount 641 of the DBMS data structure information 621. Step 2603 acquires the maximum access parallelism 569 of specified data structures by referring to the DBMS data structure information 621.

In step 2604, the amount of data of one region sequentially accessed at the time of parallel access is calculated as the total amount of use of storage region of a specified table of step 2602 per the maximum access parallelism 569 of step 2603. Since the data structure physical storage position information 712 are sorted in the order of sequential access execution, this information is used to produce the above-described data division principle with the assumption that the parallel access of maximum access parallelism 569 is executed.

Step 2605 checks if data of a specified structure are arranged on the physical storage devices 18 according to the above-mentioned data division principle produced in step 2604 by referring to the data relocation work information 670. If so, the processing goes to step 2609, the processing ends with the reason because the data relocation plan has been successfully produced. If not so, the processing goes to step 2606.

Step 2606 generates the data relocation plan on the physical storage devices 18 according to the data division principle obtained in step 2604. At this time, if data are already divided into smaller regions than a constant value, a data migration plan is generated to search for large continuous free regions, and to migrate such data thereto so that the sequential access structures can be maintained therein. In addition, a data migration plan is generated to migrate data so that the data to be separated into different access regions by a parallel access of maximum access parallelism 569 cannot be placed on the same physical device 18.

Step 2607 checks if the data migration plan production processing of step 2606 has been successfully executed. If it has been successfully performed, the processing goes to step 2608. If it has been failed, the processing goes to step 2610 where the processing ends with the reason because the data relocation plan has been failed to produce.

Step 2608 makes the produced data migration plan be stored in the migration plan information 750, and the processing goes to step 2609 where the processing ends with the reason because the plan has been successfully produced.

<Second Embodiment>

According to this embodiment, in a computer system having computers in which DBMS is executed, a storage apparatus for managing files as units and a network through which those computers and storage apparatus are connected, the storage apparatus acquires information of DBMS, and information of the mapping of data storage positions on the outside of the storage apparatus, and improves its operation by using those information.

The storage apparatus has the function to dynamically change the storage positions of data within it, generates an appropriate data relocation plan on the basis of the acquired information. The storage apparatus also makes data allocation according to the formed data relocation plan by using the function for dynamically changing the data storage positions, thereby improving the access performance. Moreover, data cache control is performed on the basis of the acquired information to achieve better access performance characteristics.

FIG. 27 is a block diagram of a computer system of the second embodiment according to the invention. As illustrated, the second embodiment of the invention is different from the first embodiment as follows. In FIG. 27, like elements corresponding to or portions having functions equivalent to those in the first embodiment are identified by the same reference numerals.

In this embodiment, the I/O path interface 70, I/O path 71 and I/O path switch 72 are not provided, but a storage apparatus lob, and DB hosts 80c, 80d are connected only through the network 79. The storage apparatus 10 is changed as storage apparatus 10b for managing files of data as units. Thus, the physical storage device operation information 32, data cache management information 34, DBMS data information 38 and volume physical storage position management information 36 are changed as physical storage device operation information 32b, data cache management information 34b, DBMS data information 38b and file storage management information 36b, respectively.

The OS 100 executed on DB host 80c, 80d has volume manager 102 and file system 104 deleted, and instead a network file system 104b added which has the function to access to the files that the storage apparatus 10b provides. The mapping information 106 that the OS 100 holds is changed as network mount information 106b.

The storage apparatus 10 is changed as storage apparatus 10b for managing files as units. The accesses from DB host 80c, 80d to the storage apparatus are executed by the protocol based on files through network 79. These access requests from hosts are handled by network interface control portion 50. In the storage apparatus 10b, the role of the volumes in the storage apparatus 10 is replaced by the files or file system for management of files, and the file storage position management information corresponds to file storage management information 36b. A plurality of file systems may exist within the single storage apparatus 10b. The operation information of physical storage devices 18 is changed from the acquisition of volumes as units to that of file systems or files as units. Even if file systems exist within the storage apparatus 10b, a data migration function can be achieved.

Figures 28, 29:
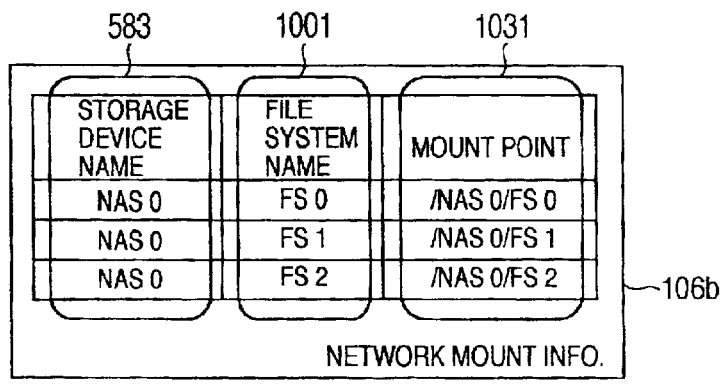
FIG. 28 is a diagram showing network mount information 106b stored within OS 100 of DB host 80c, 80d.
FIG. 29 is a diagram showing file storage management information 36b held within the storage apparatus 10b.

FIG. 28 shows the network mount information 106b stored within the OS 100 of the DB host 80c, 80d. The network mount information 106b is information of file systems that are supplied from the storage apparatus 10b, and mounted on the DB host 80c, 80d. The file system information hold a set of a storage device name 583 as an identifier for the storage device from which a file system is supplied, and a file system name 1001 as an identifier for the file system, and a mount point 1031 as an identifier for mount point information of the file system.

FIG. 29 shows the file storage management information 36b held within the storage apparatus 10b. This information 36b is different from the volume physical storage position management information 36 of FIG. 5 in that the volume physical storage position main information 510 and volume data migration management information 511 are replaced by file physical storage position information 510b and file data migration management information 511b, respectively. That is, the volume name 501 as an identifier for volume is changed to the file system name 1001 and file path name 1002 for an identifier for file, and the volume logical block number 512 and migration logical block number 782 for indicating the data regions within volumes are changed to file block number 1003 and migration file block number 1021, respectively.

Here, an entry 1015 in which the file path name 1002 is "Empty" is a special entry. This entry indicates regions not assigned as storage regions within a specified file system, of the regions of physical storage devices 18 of the storage apparatus 10b. The data to be migrated to the regions are copied according to the processing procedure mentioned in connection with the data migration system using the volume data migration management information 511 of FIG. 5, thereby achieving a function to dynamically change the physical storage positions of data.

It is to be noted here that the number of restricting conditions on the data migration destination is increased when the data migration plan is formed. In this embodiment, a plurality of file systems are allowed to hold in a storage apparatus. General file systems cannot utilize the region where another file system manages. That is, when a general file system is used, it is necessary to make the migration of file data within the file system in which the files exist. However, if there is a mechanism that enables a certain file system to use the region that another file system manages, the file migration is not limited to the above requirement.

FIG. 30 shows the physical storage device operation information 32b held within the storage apparatus 10b. This information is different from the physical storage device operation information 32 of FIG. 6 in that the volume name 501 has been changed to file system name 1001 because of the change of the operation information acquisition unit from volume to file system. In addition, the operation information acquisition unit may be treated as file, and in this case, the volume name 501 is changed to file system name 1001 and file path name 1002.

FIG. 31 shows the DBMS data information 38b held within the storage apparatus 10b. This information is different from the information 38 of FIG. 7 in that the data structure physical storage position information 712 is modified into information 712b because of the change from the volume use storage management to the file use storage management.

FIG. 32 shows the data structure physical storage position information 712b included in the DBMS data information 38b. This information 712b is different from the information 712 of FIG. 9 in that the volume name 501 and volume logical block number 512 are changed to file system name 1001, file path name 1002 and file block number 1003 because of the change from the volume use storage management to the file use storage management. This information is generated by acquiring the DBMS data storage position information 622 and net work mount information 106b from the outside of storage apparatus 10b, referring to the file physical storage position information 510b and combining the corresponding portions.

FIG. 33 shows the data cache management information 34b held in the storage apparatus 10b. The information 34b is different from the information 34 of FIG. 13 in that the cache segment information 720 is modified into cache segment information 720b because of the change from the volume use storage management to the file use storage management. The changes of the cache segment information 720b from the information 720 are the changes of volume name 501 and volume logical block number 512 to the file system name 1001, file path name 1002 and file block number 1003 for the above reason.

Figure 34:
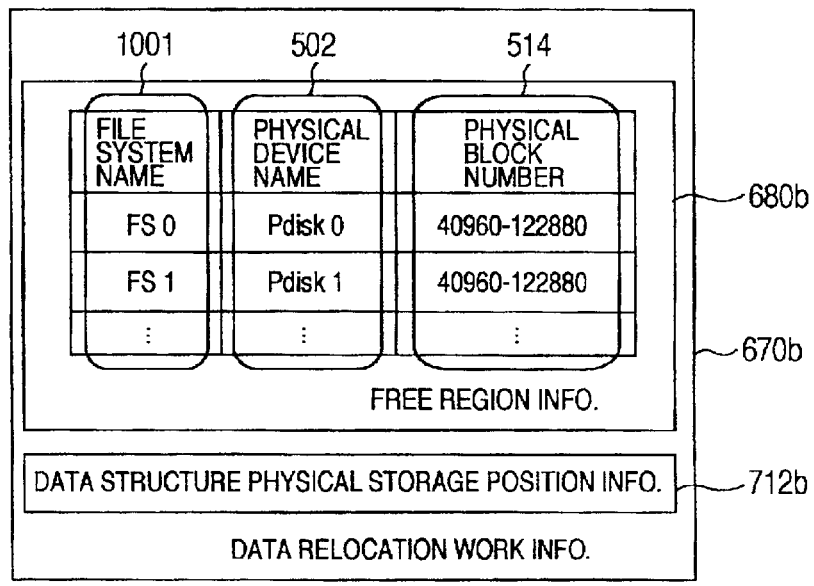
FIG. 34 is a diagram showing data relocation work information 670b that are used in the data allocation analysis/relocation plan production processing.

FIG. 34 shows data relocation work information 670b as the information generated in step 2003. This information 670b is different from the information 670 of FIG. 19 in that the free region information 680 and data structure physical storage position information 712 are modified into free region information 680b and data structure physical storage position information 712b because of the change from the volume use storage management to the file use storage management. The changes of free region information 680b from information 680 can be considered as follows. Since regions are managed by use of file system, the free region management is needed to consider file system, and thus the free region information holds a set of the physical storage device name 502 and physical block number 514 indicating the place not used for data storage, and the file system name 1001 for managing the free regions. The free region information 680b is initialized by collecting the regions in which the file path name 1001 of the file physical storage position main information 510b is "Empty".

Figure 35:
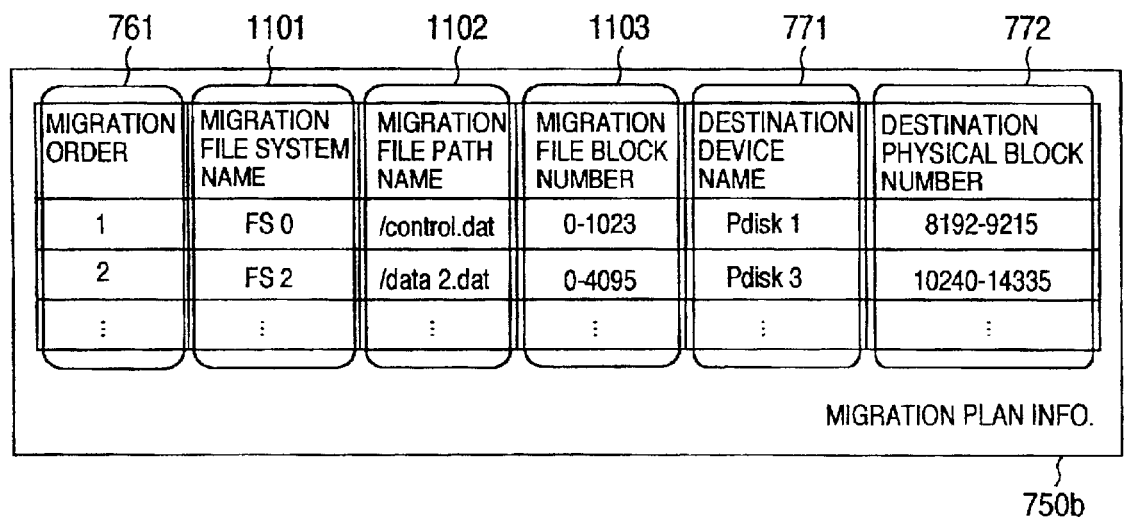
FIG. 35 is a diagram showing migration plan information 750b for storing a data migration plan produced in the data allocation analysis/relocation plan generation processing.

FIG. 35 shows migration plan information 750b that stores the data migration plan produced by the data allocation analysis/data relocation plan production processing executed in step 2004. This information 750b is different from the information 750 of FIG. 20 in that the migration volume name 568 and migration volume logical block number 769 have been changed to the migration file system name 1101, migration file path name 1102 and migration file block number 1103 because of the change from the volume use storage management to the file use storage management.

When the general file system is used in the storage apparatus, it is necessary to migrate files within the file system in which the files exist as described above. Therefore, the data relocation plan production processing of this embodiment is different from the first embodiment in that there is added a restriction that the place to which data is migrated is limited to the file system in which data currently exist. However, this restriction is also removed if there is a mechanism that enables the file system used by the storage apparatus 10b to utilize the regions that another system manages.

The difference of this embodiment of storage apparatus 10b from the first embodiment is almost the change of volume name 501 to file system name 1001 and file path name 1002 and the change of the volume logical block number 512 to file block number 1003. The other changes have also been described above. If the processing in the storage apparatus 10b can be performed by making fundamentally the same changes as mentioned so far except the restrictions in the above data relocation plan processing, the processing in the first embodiment can be substantially applied directly to this embodiment.

It should be further understood by those skilled in the art that the foregoing description has been made on embodiments of the invention and that various changes and modifications may be made in the invention without departing from the spirit of the invention and the scope of the appended claims.

What is claimed is:

1. A storage apparatus comprising:
   connection means for connecting to a computer in which a database management system operates; and
   information acquiring means for acquiring information of data structures including tables, indexes, and logs defined by schema in said database management system, and information of recording positions of data of a database in said storage apparatus that are managed by said database management system and grouped under each of said data structures defined by said schema;
   at least one physical storage device for storing data;
   logical-to-physical position conversion means by which logical storage positions used when said computer makes access to said storage apparatus are converted to physical storage positions at which data can be actually stored within said physical storage device;
   data allocation changing means for changing said physical storage positions within said at least one physical storage device corresponding to said logical storage positions; and
   allocation changing plan generation means for generating a plan for changing the physical storage positions of data corresponding to said logical storage positions by using said information acquired by said information acquiring means.

2. A storage apparatus according to claim 1, wherein said connection means is used to connect to said computer in which a plurality of said database management systems operate.

3. A storage apparatus according to claim 1, wherein said connection means is used to connect to a plurality of said computers in which said database management system operates.

4. A storage apparatus according to claim 1, wherein said information acquiring means acquires information of said database managed by a plurality of said database management systems.

5. A storage apparatus according to claim 1, wherein said information acquiring means acquires said information by using said connection means.

6. A storage apparatus according to claim 1, wherein said information acquiring means acquires information of said database that said database management system manages from said database management system.

7. A storage apparatus according to claim 1, wherein said information acquiring means acquires information of said database that said database management system manages through at least one program different from said database management system.

8. A storage apparatus according to claim 1, further comprising automatic data relocation means for automatically changing data allocation by use of said allocation changing means and according to said plan produced by said allocation changing plan generation means.

9. A storage apparatus according to claim 1, further comprising:
   a cache memory; and
   cache memory control means for controlling said cache memory by using said information acquired by said information acquiring means, wherein the information acquired by said information acquiring means further includes a method of controlling data of said database that said database management system executes on a host cache that said computer has on its memory, and computer cache data information associated with the amount of data of said host cache.

10. A storage apparatus according to claim 9, wherein said cache memory control means compares said amount of computer cache data that are associated with said data structures defined by said schema and cached on said computer memory, and the size of actual data of said data structures, and decides the priority with which the data stored at storage positions of said actual data of said data structures are cached by using said compared results.

11. A storage apparatus according to claim 9, wherein said cache memory control means compares said amount of computer cache data of said data structures and the usable amount of said cache memory to data belonging to said data structures in said storage apparatus, and decides the priority with which the data stored at the storage positions of said actual data of said data structures are cached by using said compared results.

12. A storage apparatus according to claim 1, wherein said allocation changing plan means creates said plan for changing the physical storage positions of data corresponding to said logical storage positions, according to a characteristic of said at least one physical storage device.

13. A storage apparatus according to claim 12, wherein said allocation changing plan means creates said plan for changing the physical storage positions of data corresponding to said logical storage positions, according to an access frequency to said storage apparatus by an application using said storage apparatus.

14. A storage apparatus comprising:
   connection means for connecting to a computer in which a database management system operates; and
   information acquiring means for acquiring information of data structures including tables, indexes, and logs defined by schema in said database management system, and information of recording positions of data of a database in said storage apparatus that are managed by said database management system and grouped under each of said data structures defined by said schema;
   at least one physical storage device for storing data;
   logical-to-physical position conversion means by which logical storage positions used when said computer makes access to said storage apparatus are converted to physical storage positions at which data can be actually stored within said physical storage device;
   data allocation changing means for changing said physical storage positions within said at least one physical storage corresponding to said logical storage positions; and
   allocation changing plan generation means for generating a plan for changing the physical storage positions of data corresponding to said logical storage positions by using said information acquired by said information acquiring means,
   wherein said allocation changing plan generation means decides places to access and the order to access when said database management system makes access to said database sequentially on the basis of said information acquired by said information acquiring means, and makes data of said sequentially accessed data in said database be placed in continuous regions on said physical storage device in order that said data can be matched to said sequential access order.

15. A storage apparatus comprising:
   connection means for connecting to a computer in which a database management system operates; and
   information acquiring means for acquiring information of data structures including tables, indexes, and logs defined by schema in said database management system, and information of recording positions of data of a database in said storage apparatus that are managed by said database management system and grouped under each of said data structures defined by said schema;
   at least one physical storage device for storing data;
   logical-to-physical position conversion means by which logical storage positions used when said computer makes access to said storage apparatus are converted to physical storage positions at which data can be actually stored within said physical storage device;
   data allocation changing means for changing said physical storage positions within said at least one physical storage corresponding to said logical storage positions; and
   allocation changing plan generation means for generating a plan for changing the physical storage positions of data corresponding to said logical storage positions by using said information acquired by said information acquiring means, wherein:
   said information acquired by said information acquiring means further includes information of degree of parallelism used when said database management system makes access to data of said database that belong to the same one of said data structures defined by said schema, and
   said allocation changing plan generation means makes data of said database that belong to the same one of said data structures defined by said schema be placed on a plurality of said physical storage devices on the basis of said acquired information.

16. A storage apparatus comprising:
   connection means for connecting to a computer in which a database management system operates; and
   information acquiring means for acquiring information of data structures including tables, indexes, and logs defined by schema in said database management system, and information of recording positions of data of a database in said storage apparatus that are managed by said database management system and grouped under each of said data structures defined by said schema;
   at least one physical storage device for storing data;
   logical-to-physical position conversion means by which logical storage positions used when said computer makes access to said storage apparatus are converted to physical storage positions at which data can be actually stored within said physical storage device;

data allocation changing means for changing said physical storage positions within said at least one physical storage corresponding to said logical storage positions; and allocation changing plan generation means for generating a plan for changing the physical storage positions of data corresponding to said logical storage positions by using said information acquired by said information acquiring means, wherein said allocation changing plan generation means detects a set of data of said database that are highly likely to be simultaneously accessed, and allocates said set of data on said different physical storage devices on the basis of said acquired information.

17. A storage apparatus according to claim 16, wherein said allocation changing plan generation means extracts table data and index data associated with said table data, and registers said table and index data as a set of said data of said database that are highly likely to be accessed at a time when said index is a free-structured index.

18. A storage apparatus according to claim 16, wherein information of said database includes information of history of execution that said database management system has made so far.

19. A storage apparatus according to claim 16, further comprising physical storage device operation information acquiring means for acquiring the operation information of said physical storage devices, wherein said allocation changing plan generation means utilizes said operation information acquired by said physical storage device operation information acquiring means.

20. A storage apparatus according to claim 16, wherein said allocation changing plan generation means registers log data to be recorded when said database management system updates data and other data of said database, as a set of said data of said database that are highly likely to be accessed at a time.

21. A method of changing storage positions of data stored within a plurality of physical storage devices by a control unit in a storage apparatus that has connection means for connecting to a computer in which a database management system (DBMS) operates and to administrator's terminals, said plurality of physical storage devices for storing data of said DBMS, said control unit for controlling said storage apparatus and a memory useful for said control unit to control, said method comprising the steps of:

storing in said memory first information of physical storage positions of said data stored in said plurality of physical storage devices;

acquiring second information about the database processing that said DBMS makes through said connection means, and storing said second information in said memory;

converting, when said computer makes access to said storage apparatus, logical storage positions to physical storage positions at which data can be actually stored within said physical storage devices and changing said physical storage positions within said physical storage devices corresponding to said logical storage positions;

generating an allocation changing plan for changing the physical storage positions of data corresponding to said logical storage positions by using information of data structures including tables, indexes, and logs defined by schema in said database management system;

generating a plan for making data relocation between said plurality of physical storage devices in order to improve the performance of access to data in said database processing that said DBMS makes on the basis of said first and second information; and displaying said relocation plan on the display screens of said administrator's terminals through said connection means.

22. A method according to claim 21, further comprising the step of executing said relocation plan in response to an instruction transmitted through said connection means from said administrator's terminals.

23. A method of changing storage positions of data stored within a plurality of physical storage devices by a control unit in a storage apparatus that has connection means for connecting to a computer in which a database management system operates and to administrator's terminals, said plurality of physical storage devices for storing data of said DBMS, a data cache for said data, said control unit for controlling said storage apparatus and a memory useful for said control unit to control, said method comprising the steps of:

storing in said memory first information of physical storage positions of said data stored in said plurality of physical storage devices;

acquiring second information about the database processing that said DBMS makes through said connection means, and storing said second information in said memory;

converting, when said computer makes access to said storage apparatus, logical storage positions to physical storage positions at which data can be actually stored within said physical storage devices and changing said physical storage positions within said physical storage devices corresponding to said logical storage positions;

generating an allocation changing plan for changing the physical storage positions of data corresponding to said logical storage positions by using information of data structures including tables, indexes, and logs defined by schema in said database management system;

generating a plan for making data relocation between said plurality of physical storage devices in order to improve the performance of access to data in said database processing that said DBMS makes on the basis of said first and second information; and displaying said relocation plan on the display screens of said administrator's terminals through said connection means.

* * * * *